US010712830B2

(12) United States Patent
Derouin et al.

(10) Patent No.: US 10,712,830 B2
(45) Date of Patent: Jul. 14, 2020

(54) THREE-DIMENSIONAL VISUAL TARGET ACQUISITION SYSTEMS

(71) Applicants: Aaron Derouin, Ottawa (CA); Steven Fischer, Waterloo (CA)

(72) Inventors: Aaron Derouin, Ottawa (CA); Steven Fischer, Waterloo (CA); Burhanuddin Terai, Nepean (CA)

(73) Assignees: Aaron Derouin, Ottawa (CA); Steven Fischer, Waterloo (CA)

( * ) Notice: Subject to any disclaimer, the term of this patent is extended or adjusted under 35 U.S.C. 154(b) by 0 days.

(21) Appl. No.: 16/273,311

(22) Filed: Feb. 12, 2019

(65) Prior Publication Data

US 2019/0250715 A1 Aug. 15, 2019

Related U.S. Application Data

(60) Provisional application No. 62/630,391, filed on Feb. 14, 2018.

(51) Int. Cl.

| | |
|---|---|
| ***G06F 3/01*** | (2006.01) |
| ***G02B 27/01*** | (2006.01) |
| ***G06N 7/00*** | (2006.01) |
| ***G02B 27/00*** | (2006.01) |
| ***G06T 19/00*** | (2011.01) |
| ***G06F 3/0484*** | (2013.01) |

(52) U.S. Cl.

CPC ......... *G06F 3/017* (2013.01); *G02B 27/0093* (2013.01); *G02B 27/0172* (2013.01); *G06F 3/011* (2013.01); *G06F 3/012* (2013.01); *G06F 3/04842* (2013.01); *G06N 7/00* (2013.01); *G06T 19/006* (2013.01); *G06F 3/015* (2013.01)

(58) Field of Classification Search

CPC ................................ G06F 3/017; G06F 3/012
USPC ........................................................ 715/863
See application file for complete search history.

(56) References Cited

U.S. PATENT DOCUMENTS

| | | | | |
|---|---|---|---|---|
| 8,717,318 | B2 * | 5/2014 | Anderson | G06F 3/011 345/173 |
| 9,770,203 | B1 * | 9/2017 | Berme | G09G 3/003 |
| 10,466,794 | B2 * | 11/2019 | Maeda | G06F 3/017 |

(Continued)

*Primary Examiner* — William D Titcomb
(74) *Attorney, Agent, or Firm* — Rosenberg, Klein & Lee

(57) ABSTRACT

Fitts's law is a predictive model of human movement primarily used in human-computer interaction, ergonomics, and medical assessments. A cervical orientated assessment allows assessments of aspects of users such as injuries, concussions, impacts of equipment as well as ergonomic assessments etc. Accordingly, a three-dimensional visual target acquisition system (3D-VTAS) provides measurements based upon a cervical oriented Fitts' Law paradigm in a manner which provides for ease of use, high between-day reliability and validity based upon healthy subject's performance. The 3D-VTAS also provides increased data allowing determination/verification if there are movement trajectory or target size confounds between the measurements of a subject's performance and hence assessments of both healthy and non-healthy individuals as well as assessments of ergonomic factors etc. Accordingly, subject and ergonomic effects of movement trajectory and target size can be established in either portable or fixed systems with rapid establishment and configuration.

12 Claims, 23 Drawing Sheets

T4 T6 T8 T1 T2 T7 T5 T3

(56) References Cited

U.S. PATENT DOCUMENTS

2004/0155609 A1* 8/2004 Lys ........................ H05B 45/20
315/292
2009/0153474 A1* 6/2009 Quennesson ........... G06F 3/012
345/157
2010/0007601 A1* 1/2010 Lashina .................. G06F 3/013
345/156
2014/0184550 A1* 7/2014 Hennessey .............. G06F 3/013
345/173
2014/0298273 A1* 10/2014 Blackstone ............. G06F 3/017
715/863
2015/0277555 A1* 10/2015 Morishita ............... G06F 3/011
345/156
2016/0018899 A1* 1/2016 Tu ......................... G06F 1/3234
715/863
2016/0162145 A1* 6/2016 Rivers ................... G06F 3/0486
715/769
2016/0248994 A1* 8/2016 Liu ...................... A61B 5/0059
2016/0253809 A1* 9/2016 Cole .................... H04N 13/204
345/672
2017/0123487 A1* 5/2017 Hazra ..................... G06F 3/015
2017/0285158 A1* 10/2017 Halbert ............... G01S 13/5244
2019/0196019 A1* 6/2019 Withanage Don .... G01S 7/4802
2020/0053298 A1* 2/2020 Liu ...................... A61B 5/7445

* cited by examiner

100C

100B

100E

100A

100F

100D

300B

300C

300A

| Dependent Variable | Effect | Independent Variable | F-value | Significance | Effect Size |
|---|---|---|---|---|---|
| TAT_Mean | Main | Head Supported Mass (HSM) | $F(1,14)=196.813$ | $p<0.001$ | $\eta^2=0.934$ |
| | Main | Target Size | $F(1,14)=146.629$ | $p<0.001$ | $\eta^2=0.913$ |
| | Main | Movement Trajectory | $F(3,42)=23.021$ | $p<0.001$ | $\eta^2=0.622$ |
| | Interaction | HSM * Target Size | $F(1,14)=4.807$ | $p=0.046$ | $\eta^2=0.256$ |
| | Interaction | Movement Trajectory * Target Size | $F(3,42)=4.007$ | $p=0.017$ | $\eta^2=0.223$ |
| EI_Mean | Main | HSM | $F(1,14)=101.981$ | $p<0.001$ | $\eta^2=0.879$ |
| | Main | Target Size | $F(1,14)=45.71$ | $p<0.001$ | $\eta^2=0.766$ |
| TMOT_Mean | Main | HSM | $F(1,14)=34.708$ | $p<0.001$ | $\eta^2=0.713$ |

Figure 8A

| Survey Questions | | | | | Average Rating |
|---|---|---|---|---|---|
| How ineffective or effective was the visual target acquisition system in assessing your neck function? | | | | | |
| Very Ineffective ☐ | Moderately Ineffective ☐ | Neither Ineffective or Effective ☐ | Moderately Effective ☐ | Very Effective ☐ | |
| How ineffective or effective was the visual target acquisition system in assessing your visual perception capabilities? | | | | | |
| Very Ineffective ☐ | Moderately ☐ | Neither Ineffective ☐ | Moderately ☐ | Very Effective ☐ | |
| What effect did the smaller (20mm) target have on your performance compared to the larger (60mm) target in terms of movement time to successfully acquire the target? | | | | | |
| Negligible Effect ☐ | Minimal Effect ☐ | Small Effect ☐ | Moderate Effect ☐ | Large Effect ☐ | |
| What effect did the dead spot on the solar panel have on your performance in successfully acquiring the 60mm target? | | | | | |
| Negligible Effect ☐ | Minimal Effect ☐ | Small Effect ☐ | Moderate Effect ☐ | Large Effect ☐ | |
| What effect did the dead spot on the solar panel have on your performance in acquiring the smaller 20mm target? | | | | | |
| No Effect ☐ | Negligible Effect ☐ | Small Effect ☐ | Moderate Effect ☐ | Large Effect ☐ | |

Figure 8B

| Movement Trajectory | Condition | Target Size | Target Acquisition Time | | | |
|---|---|---|---|---|---|---|
| | | | Day 1 ($\bar{x}$) | Day 2 ($\bar{x}$) | ICC | SEM |
| Mta -- Transverse | C01-C08 | 60mm | 1.728 (0.117) | 1.578 (0.163) | 0.351 | 0.335 |
| | C01-C08 | 20mm | 2.184 (0.283) | 2.038 (0.281) | 0.740 | 0.327 |
| MTb -- Sagittal | C01-C08 | 60mm | 1.888 (0.165) | 1.814 (0.152) | 0.634 | 0.167 |
| | C02-C08 | 20mm | 2.303 (0.155) | 2.316 (0.337) | 0.558 | 0.032 |
| MTc -- Off-Axis | C01-C08 | 60mm | 1.833 (0.232) | 1.708 (0.118) | 0.365 | 0.279 |
| | C02-C08 | 20mm | 2.288 (0.180) | 2.190 (0.193) | 0.586 | 0.219 |
| MTd -- Off-Axis | C01-C08 | 60mm | 1.852 (0.197) | 1.799 (0.203) | 0.330 | 0.118 |
| | C02-C08 | 20mm | 2.377 (0.215) | 2.259 (0.252) | 0.775 | 0.265 |

Figure 8C

| Movement Trajectory | Condition | Target Size | Time to Move Off Target | | | |
|---|---|---|---|---|---|---|
| | | | Day 1 ($\bar{x}$) | Day 2 ($\bar{x}$) | ICC | SEM |
| Mta -- Transverse | C01-C08 | 60mm | 0.463 (0.047) | 0.398 (0.064) | 0.519 | 0.145 |
| | C02-C08 | 20mm | 0.458 (0.052) | 0.400 (0.061) | 0.322 | 0.130 |
| MTb -- Sagittal | C01-C08 | 60mm | 0.438 (0.035) | 0.409 (0.049) | 0.694 | 0.063 |
| | C02-C08 | 20mm | 0.438 (0.050) | 0.417 (0.052) | 0.847 | 0.045 |
| MTc -- Off-Axis | C01-C08 | 60mm | 0.439 (0.050) | 0.416 (0.063) | 0.610 | 0.055 |
| | C02-C08 | 20mm | 0.447 (0.039) | 0.403 (0.048) | 0.436 | 0.100 |
| MTd -- Off-Axis | C01-C08 | 60mm | 0.448 (0.054) | 0.405 (0.072) | 0.645 | 0.095 |
| | C02-C08 | 20mm | 0.468 (0.045) | 0.411 (0.062) | -0.080 | 0.126 |

Figure 8D

| Movement Trajectory | Condition | Target Size | Error Index | | | |
|---|---|---|---|---|---|---|
| | | | Day 1 ($\bar{x}$) | Day 2 ($\bar{x}$) | ICC | SEM |
| Mta -- Transverse | C01 | 60mm | 1.356 (0.092) | 1.309 (0.130) | 0.355 | 0.105 |
| | C02 | 20mm | 1.656 (0.234) | 1.585 (0.314) | 0.913 | 0.158 |
| MTb -- Sagittal | C01 | 60mm | 1.462 (0.178) | 1.333 (0.109) | 0.532 | 0.286 |
| | C02 | 20mm | 1.591 (0.218) | 1.631 (0.331) | 0.650 | 0.089 |
| MTc -- Off-Axis | C01 | 60mm | 1.365 (0.180) | 1.258 (0.097) | 0.597 | 0.239 |
| | C02 | 20mm | 1.653 (0.263) | 1.595 (0.328) | -0.187 | 0.130 |
| MTd -- Off-Axis | C01 | 60mm | 1.381 (0.215) | 1.335 (0.204) | -0.285 | 0.100 |
| | C02 | 20mm | 1.751 (0.310) | 1.608 (0.296) | 0.725 | 0.319 |

Figure 8E

THREE-DIMENSIONAL VISUAL TARGET ACQUISITION SYSTEMS

CROSS-REFERENCE TO RELATED APPLICATIONS

This application claims priority from U.S. Provisional Patent Application 62/630,391 entitled "Three Dimensional Visual Target Acquisition Systems" filed Feb. 14, 2018, the entire contents of which are incorporated herein by reference.

FIELD OF THE INVENTION

This patent application relates to target acquisition systems and more particularly to visual target acquisition systems for assessing user head and/or neck movement discretely or in combination with head mounted equipment.

BACKGROUND OF THE INVENTION

Fitts' Law has been established as a robust and pragmatic motor control principle and it has been used in a multitude of applications including ergonomics, human machine interfaces (HMIs), human-computer interactions (HCIs), and rehabilitation. Most applications of Fitts' Law are limited to understanding the relationship of movement time duration, amplitude and precision in the context of arm and hand movements of the upper extremity. In the development of HCI and the design of user interfaces robust eye tracking and detection are thought to play a crucial role. Prior to his seminal publication in 1954, Fitts et al. published a 1950 study on the eye movements of aircraft pilots during instrument-landing approaches. Since that time and up until 2003, Fitts et al. eye movement study was only cited 16 times, whereas Fitts' Law had been cited 855 times. Typically coupled with eye movement, head movement has also been found to be an effective, simple, and natural way of pointing to objects, communication, and interaction.

More recently, various studies have used Fitts' Law to quantify or evaluate head and neck movements related to two main purposes: 1) as an input control signal for rehabilitative/assistive technology designed for use by quadriplegic patients; or 2) to understand the effect of a condition, e.g. age, neck pain, tension type headache, etc. or a rehabilitative intervention on performance. The linear relationship between the index of difficulty and head movement time has been substantiated in each of these latter studies that were designed to assess the effect of various conditions or rehabilitative interventions on performance.

From a functional assessment perspective, several approaches and methods are available to the rehabilitation practitioner or clinician to evaluate neck pain and monitor a patient's progress and response to treatment, such as passive and active range of motion (ROM), muscle strength and endurance, and joint position sense. Although some of these functional assessment measures have been shown within the literature as having high to moderate reliability in terms of distinguishing different types of neck pain patients from each other and from controls, others such as joint repositioning and muscle strength and endurance have been shown to be less efficacious attempts to quantify the kinesthetic deficits associated with neck pain. Several approaches to measure head-repositioning have been applied. Presently, the ability of these tests in being able to discriminate between patients with whiplash associated disorders and chronic neck pain from controls has not been fully established. It has been suggested that these tests may be affected by motivational factors and are not necessarily always performance based.

In a systematic review of the literature of patients with chronic, idiopathic neck pain, it was identified that there is a paucity of studies and that there were relevant limitations associated with evaluating complex or postural repositioning tests that did not permit any solid conclusions about them. However, the ability of head-to-neutral repositioning tests to consistently distinguish between-study and between-subgroup effects was found and suggests that people with chronic, idiopathic neck pain have poorer performance than asymptomatic controls. In 8 of the 13 studies included in the systematic review, 6 research articles made reference to a test-retest reliability methodology and 2 studies assessed a novel approach to using joint position sense to evaluate cervicocephalic proprioception using a test-retest approach. Empirically, the importance of determining the reliability of a tool or measure prior to its implementation in a clinical setting cannot be overstated. This is particularly true for rehabilitation practitioners and clinicians who rely on evidence-based practice in designing treatment plans and evaluating a patient's progress and response to treatment. Therefore, it is imperative to have reliable measures available to the rehabilitation practitioner to assess and monitor treatment outcomes in patients with neck pain.

Given the demonstrated utility of a cervical-based Fitts' Law motor control paradigm in discriminating old subjects from young, chronic neck pain, and tension type headaches from controls, Fitts Law may potentially be used as a predictive ergonomic tool to assess the effect of ergonomic stressors on the cervical spine. However, to inspire confidence in the utility and validity of a functional assessment tool to be used by physical therapists, chiropractors, ergonomists and kinesiologists, it is important to establish the reliability of the measure. For example, given the variability of chronic symptoms overtime, it is essential to establish the minimum detectable change and the between-day reliability of cervical impairment measures so that meaningful improvements in patients treated for chronic neck pain can be identified. Furthermore, the inclusion of methods for objective and quantitative assessment of dysfunctions in clinical practice is important in order to increase the precision of diagnosis and to enable rational development of rehabilitation methods for specific dysfunctions.

Though the robustness of Fitts' Law as a motor control measure is not in question, the reliability of the experimental protocol and associated equipment used in evaluating performance in a cervical-based Fitts' Law paradigm has yet to be established. Accordingly, the inventors have established a three-dimensional (3D) visual target acquisition system (VTAS), e.g. a 3D-VTAS, which is intended to provide measurements based upon a cervical oriented Fitts' Law paradigm which provides for ease of use, high between-day reliability and validity based upon healthy subject's performance. Additionally, the 3D-VTAS provides for increased data by allowing for determination/verification if there are movement trajectory or target size confounds between the measurements of a subject's performance and hence assessments of both healthy and non-healthy individuals as well as assessments of ergonomic factors etc. Accordingly, subject and ergonomic effects of movement trajectory and target size can be established. Beneficially, 3D-VTAS according to embodiments of the invention provide for quick establishment and configuration providing portable systems as well as fixed systems as well as reconfiguration for assessments of movement trajectory effects and target size performance.

The inventors have established 3D-VTAS according to embodiments of the invention based upon the hypothesis that a 3D-VTAS will provide high measurement reliability across four different dependent variables which are dependent on the movement trajectory alignment with the primary motion axes of the cervical spine. These dependent variables being dwell time (DT), target acquisition time (TAT), time to move off target (TMOT), and error index (EI).

Other aspects and features of the present invention will become apparent to those ordinarily skilled in the art upon review of the following description of specific embodiments of the invention in conjunction with the accompanying figures.

SUMMARY OF THE INVENTION

It is an object of the present invention to mitigate limitations within the prior art relating to target acquisition systems and more particularly to visual target acquisition systems for assessing user head and/or neck movement discretely or in combination with head mounted equipment.

In accordance with an embodiment of the invention there is provided a method comprising:

providing to a user a plurality of targets, each target comprising a target zone and an indicator capable of presenting a plurality of indications to the user;

determining timing data relating to acquisition of a subset of the plurality of targets; and establishing data relating to the user in dependence upon the timing data.

In accordance with an embodiment of the invention there is provided a method of establishing data relating to movement of a predetermined element of a user's anatomy based upon establishing timing information with respect to the movement of the predetermined element of the user's anatomy in establishing acquisition of a plurality of targets.

In accordance with an embodiment of the invention there is provided a system for establishing data relating to movement of a predetermined element of a user's anatomy based upon establishing timing information with respect to the movement of the predetermined element of the user's anatomy in establishing acquisition of a plurality of targets.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein:

FIG. 8A depicts statistical analysis through a repeated measures of analysis of variance (ANOVA) for a visual target acquisition system according to an embodiment of the invention;

FIG. 8B depicts an example of a series of survey questions administered to participants following completion of a data collection session using a visual target acquisition system according to an embodiment of the invention;

FIGS. 8C to 8E depict examples of test-retest reliability results across movement trajectory and target sizes conditions for users exploiting a visual target acquisition system according to an embodiment of the invention;

DETAILED DESCRIPTION

Figure 1A:
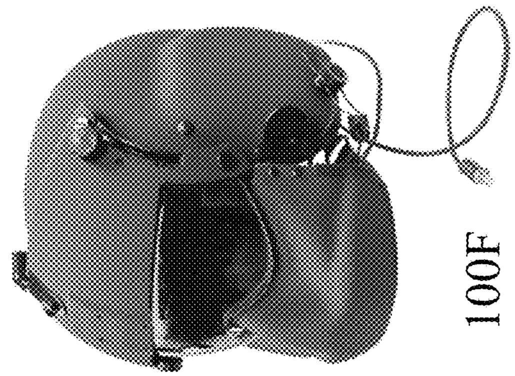
FIGS. 1A and 1B depict examples of head worn devices associated with different activities and can be assessed for short-term and long-term impact using a visual target acquisition system according to an embodiment of the invention.
Figure 1A:
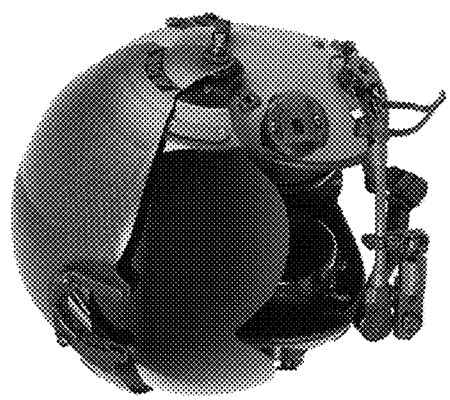
Figure 1A:
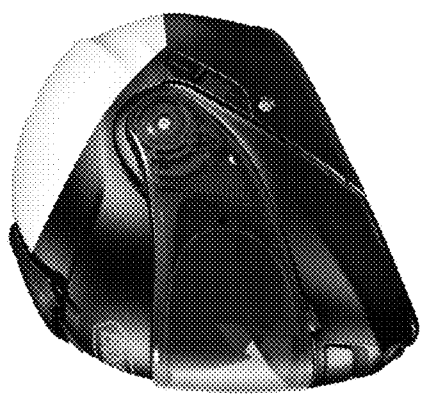

The present invention is directed to target acquisition systems and more particularly to visual target acquisition systems for assessing user head and/or neck movement discretely or in combination with head mounted equipment.

The ensuing description provides representative embodiment(s) only, and is not intended to limit the scope, applicability or configuration of the disclosure. Rather, the ensuing description of the embodiment(s) will provide those skilled in the art with an enabling description for implementing an embodiment or embodiments of the invention. It being understood that various changes can be made in the function and arrangement of elements without departing from the spirit and scope as set forth in the appended claims. Accordingly, an embodiment is an example or implementation of the inventions and not the sole implementation. Various appearances of "one embodiment," "an embodiment" or "some embodiments" do not necessarily all refer to the same embodiments. Although various features of the invention may be described in the context of a single embodiment, the features may also be provided separately or in any suitable combination. Conversely, although the invention may be described herein in the context of separate embodiments for clarity, the invention can also be implemented in a single embodiment or any combination of embodiments.

Reference in the specification to "one embodiment", "an embodiment", "some embodiments" or "other embodiments" means that a particular feature, structure, or characteristic described in connection with the embodiments is included in at least one embodiment, but not necessarily all embodiments, of the inventions. The phraseology and terminology employed herein is not to be construed as limiting but is for descriptive purpose only. It is to be understood that where the claims or specification refer to "a" or "an" element, such reference is not to be construed as there being only one of that element. It is to be understood that where the specification states that a component feature, structure, or characteristic "may", "might", "can" or "could" be included, that particular component, feature, structure, or characteristic is not required to be included.

Reference to terms such as "left", "right", "top", "bottom", "front" and "back" are intended for use in respect to the orientation of the particular feature, structure, or element within the figures depicting embodiments of the invention. It would be evident that such directional terminology with respect to the actual use of a device has no specific meaning as the device can be employed in a multiplicity of orientations by the user or users.

Reference to terms "including", "comprising", "consisting" and grammatical variants thereof do not preclude the addition of one or more components, features, steps, integers or groups thereof and that the terms are not to be construed as specifying components, features, steps or integers. Likewise, the phrase "consisting essentially of", and grammatical variants thereof, when used herein is not to be construed as excluding additional components, steps, features integers or groups thereof but rather that the additional features, integers, steps, components or groups thereof do not materially alter the basic and novel characteristics of the claimed composition, device or method. If the specification or claims refer to "an additional" element, that does not preclude there being more than one of the additional element.

A "portable electronic device" (PED) as used herein and throughout this disclosure, refers to a wireless device used for communications and other applications that requires a battery or other independent form of energy for power. This includes devices, but is not limited to, such as a cellular telephone, smartphone, personal digital assistant (PDA), portable computer, pager, portable multimedia player, portable gaming console, laptop computer, tablet computer, a wearable device and an electronic reader.

A "fixed electronic device" (FED) as used herein and throughout this disclosure, refers to a wireless and/or wired device used for communications and other applications that requires connection to a fixed interface to obtain power. This includes, but is not limited to, a laptop computer, a personal computer, a computer server, a kiosk, a gaming console, a digital set-top box, an analog set-top box, an Internet enabled appliance, an Internet enabled television, and a multimedia player.

A "server" as used herein, and throughout this disclosure, refers to one or more physical computers co-located and/or geographically distributed running one or more services as a host to users of other computers, PEDs, FEDs, etc. to serve the client needs of these other users. This includes, but is not limited to, a database server, file server, mail server, print server, web server, gaming server, or virtual environment server.

An "application" (commonly referred to as an "app") as used herein may refer to, but is not limited to, a "software application", an element of a "software suite", a computer program designed to allow an individual to perform an activity, a computer program designed to allow an electronic device to perform an activity, and a computer program designed to communicate with local and/or remote electronic devices. An application thus differs from an operating system (which runs a computer), a utility (which performs maintenance or general-purpose chores), and a programming tools (with which computer programs are created). Generally, within the following description with respect to embodiments of the invention an application is generally presented in respect of software permanently and/or temporarily installed upon a PED and/or FED.

An "enterprise" as used herein may refer to, but is not limited to, a provider of a service and/or a product to a user, customer, or consumer. This includes, but is not limited to, a retail outlet, a store, a market, an online marketplace, a manufacturer, an online retailer, a charity, a utility, and a service provider. Such enterprises may be directly owned and controlled by a company or may be owned and operated by a franchisee under the direction and management of a franchiser.

A "service provider" as used herein may refer to, but is not limited to, a third party provider of a service and/or a product to an enterprise and/or individual and/or group of individuals and/or a device comprising a microprocessor. This includes, but is not limited to, a retail outlet, a store, a market, an online marketplace, a manufacturer, an online retailer, a utility, an own brand provider, and a service provider wherein the service and/or product is at least one of marketed, sold, offered, and distributed by the enterprise solely or in addition to the service provider.

A "third party" or "third party provider" as used herein may refer to, but is not limited to, a so-called "arm's length" provider of a service and/or a product to an enterprise and/or individual and/or group of individuals and/or a device comprising a microprocessor wherein the consumer and/or customer engages the third party but the actual service and/or product that they are interested in and/or purchase and/or receive is provided through an enterprise and/or service provider.

A "user" as used herein may refer to, but is not limited to, an individual or group of individuals. This includes, but is not limited to, private individuals, employees of organizations and/or enterprises, members of community organizations, members of charity organizations, men and women. In its broadest sense the user may further include, but not be limited to, software systems, mechanical systems, robotic systems, android systems, etc. that may be characterised by an ability to exploit one or more embodiments of the invention. A user may be associated with biometric data which may be, but not limited to, monitored, acquired, stored, transmitted, processed and analysed either locally or remotely to the user. A user may also be associated through one or more accounts and/or profiles with one or more of a service provider, third party provider, enterprise, social network, social media etc. via a dashboard, web service, website, software plug-in, software application, and graphical user interface.

"User information" as used herein may refer to, but is not limited to, user behavior information and/or user profile information. It may also include a user's biometric information, an estimation of the user's biometric information, or a projection/prediction of a user's biometric information derived from current and/or historical biometric information.

A "wearable device" or "wearable sensor" relates to miniature electronic devices that are worn by the user including those under, within, with or on top of clothing and are part of a broader general class of wearable technology which includes "wearable computers" which in contrast are directed to general or special purpose information technologies and media development. Such wearable devices and/or wearable sensors may include, but not be limited to, smartphones, smart watches, e-textiles, smart shirts, activity trackers, smart glasses, environmental sensors, medical sensors, biological sensors, physiological sensors, chemical sensors, ambient environment sensors, position sensors, neurological sensors, drug delivery systems, medical testing and diagnosis devices, and motion sensors.

"Quantified self" as used herein may refer to, but is not limited to, the acquisition and storage of data relating to a user's daily life in terms of inputs (e.g. food consumed, quality of surrounding air), states (e.g. mood, arousal, blood oxygen levels), and performance (mental and physical). Acquisition of data may be combined wearable sensors (EMG, EEG, EOG, ECG, video, etc.) and wearable computing together with audio, visual, audiovisual and text-based content generated by the user.

"Biometric" information as used herein may refer to, but is not limited to, data relating to a user characterised by data relating to a subset of conditions including, but not limited to, their environment, medical condition, biological condition, physiological condition, chemical condition, ambient environment condition, position condition, neurological condition, drug condition, and one or more specific aspects of one or more of these said conditions. Accordingly, such biometric information may include, but not be limited, blood oxygenation, blood pressure, blood flow rate, heart rate, temperate, fluidic pH, viscosity, particulate content, solids content, altitude, vibration, motion, perspiration, EEG, ECG, energy level, etc. In addition, biometric information may include data relating to physiological characteristics related to the shape and/or condition of the body wherein examples may include, but are not limited to, fingerprint, facial geometry, baldness, DNA, hand geometry, odour, and scent. Biometric information may also include data relating to behavioral characteristics, including but not limited to, typing rhythm, gait, and voice.

"Electronic content" (also referred to as "content" or "digital content") as used herein may refer to, but is not limited to, any type of content that exists in the form of digital data as stored, transmitted, received and/or converted wherein one or more of these steps may be analog although generally these steps will be digital. Forms of digital content include, but are not limited to, information that is digitally broadcast, streamed or contained in discrete files. Viewed narrowly, types of digital content include popular media types such as MP3, JPG, AVI, TIFF, AAC, TXT, RTF, HTML, XHTML, PDF, XLS, SVG, WMA, MP4, FLV, and PPT, for example, as well as others, see for example http://en.wikipedia.org/wiki/List_of_file_formats. Within a broader approach digital content may include any type of digital information, e.g. digitally updated weather forecast, a GPS map, an eBook, a photograph, a video, a Vine™, a blog posting, a Facebook™ posting, a Twitter™ tweet, online TV, etc. The digital content may be any digital data that is at least one of generated, selected, created, modified, and transmitted in response to a user request, said request may be a query, a search, a trigger, an alarm, and a message for example.

A "profile" as used herein, and throughout this disclosure, refers to a computer and/or microprocessor readable data file comprising data relating to settings and/or limits of a visual target acquisition. Such profiles may be established by a manufacturer/supplier/provider of a device, service, etc. or they may be established by a user through a user interface for a device, a service or a PED/FED in communication with a device, another device, a server or a service provider etc.

As noted supra the inventors have established three-dimensional (3D) visual target acquisition systems (VTAS), e.g. 3-VTAS, that according to embodiments of the invention support portable systems as well as fixed systems, rapid configuration or reconfiguration, and high repeatability based upon the hypothesis that a 3D-VTAS will provide high measurement reliability across four different dependent variables which are dependent on the movement trajectory alignment with the primary motion axes of the cervical spine. These dependent variables being dwell time (DT), target acquisition time (TAT), time to move off target (TMOT), and error index (EI). Such a cervical orientated assessment allows assessments of aspects of users including, but not limited to, injuries, concussions, assessment of equipment impacts to users (e.g. helmets etc.) as well as ergonomics etc.

Figure 1B:
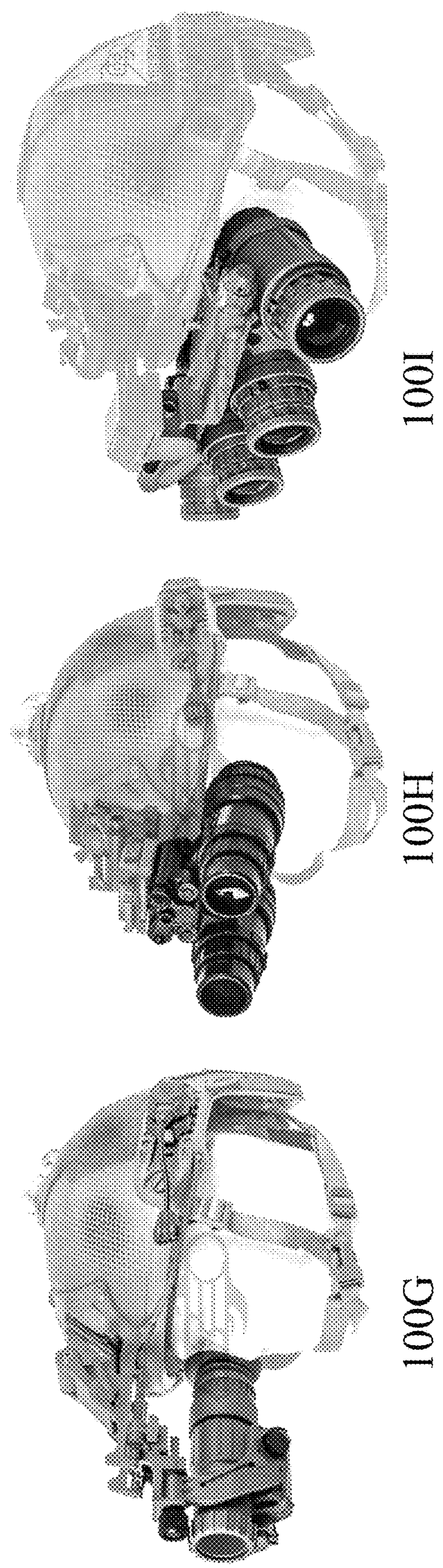
Figure 1B:
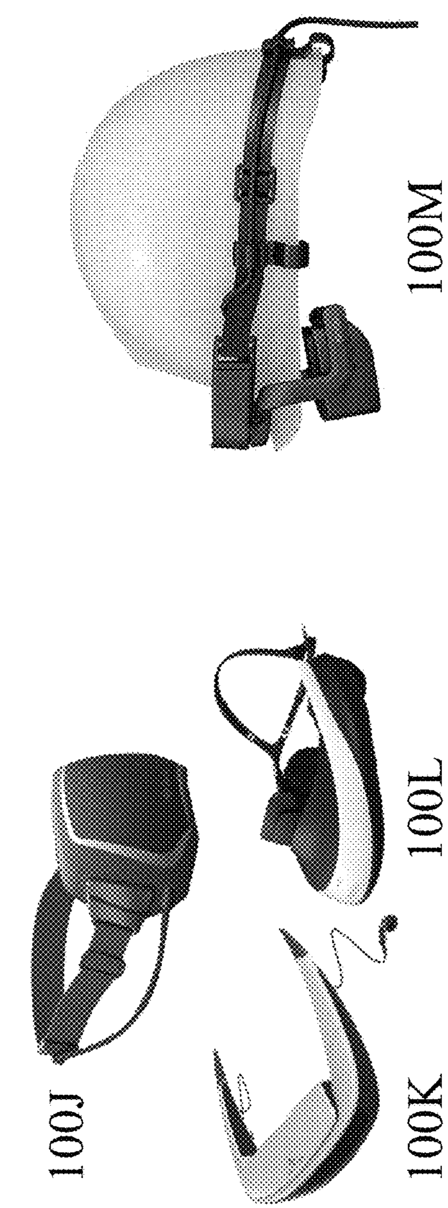

Referring to FIGS. 1A and 1B there are depicted examples in first to thirteenth images 100A to 100M of head mounted devices which may be employed by users within their employment and/or recreational activities. As depicted, these are:

- First image 100A of a Gentex HGU-55/GTX Fixed Wing Aircrew Helmet System;
- Second image 100B of a Gentex ALPHA 900 Rotary Wing/Non-Ejection Fixed Wing Cross-Platform Helmet System;
- Third image 100C of a Gentex TBH-IIIA Mission Configured Helmet System;
- Fourth image 100D of a neck brace;
- Fifth image 100E of a protective helmet such as worn by motorcycle riders, all-terrain vehicle users etc.;
- Sixth image 100F of a Gentex HGU-56/P Rotary Wing Aircrew Ballistic Helmet
- Seventh image 100G of a Lancer Tactical AN/PVS-14 Monocular Night Vision system for attachment to an adapter on a Helmet System such as depicted in first to third images 100A to 100C respectively;
- Eighth image 100H of Lancer Tactical AN/PVS-15 Night Vision Goggles for attachment to an adapter on a Helmet System such as depicted in first to third images 100A to 100C respectively;
- Ninth image 100I of a Lancer Tactical GPNVG-18 Illuminated Night Vision Goggle system for attachment to an adapter on a Helmet System such as depicted in first to third images 100A to 100C respectively;
- Tenth image 100J of an Oculus Rift virtual reality (VR) headset;
- Eleventh image 100K of a head mounted display;
- Twelfth image 100L of a Sony VR headset; and
- Thirteenth image 100M of an Epson HMD for attachment to a safety helmet.

Accordingly, a user may be fitted with such head mounted/neck mounted devices and the 3D-VTAS according to embodiments of the invention allows for the ergonomics of these devices to be assessed with respect to their impact on the user's movement etc. both short-term (e.g. just being worn) or medium- and long-term (e.g. at the end of a sortie, gaming session etc.). Where the device is intended to occlude the user's eyesight then the device tested may be a dummy to provide vision for the user but match the form-fit, weight, weight distribution etc. In other examples, such as with assessing night vision goggles etc. whilst the embodiment of the invention described and depicted below employs red-green-blue LEDs to signal to the user during the measurements and experimental session it would be evident that these may be replaced with patterns of infra-red emitters, thermal emitters, numbers, alphanumeric characters, symbols etc. in order to signal to the user.

Figures 1C, 1D:
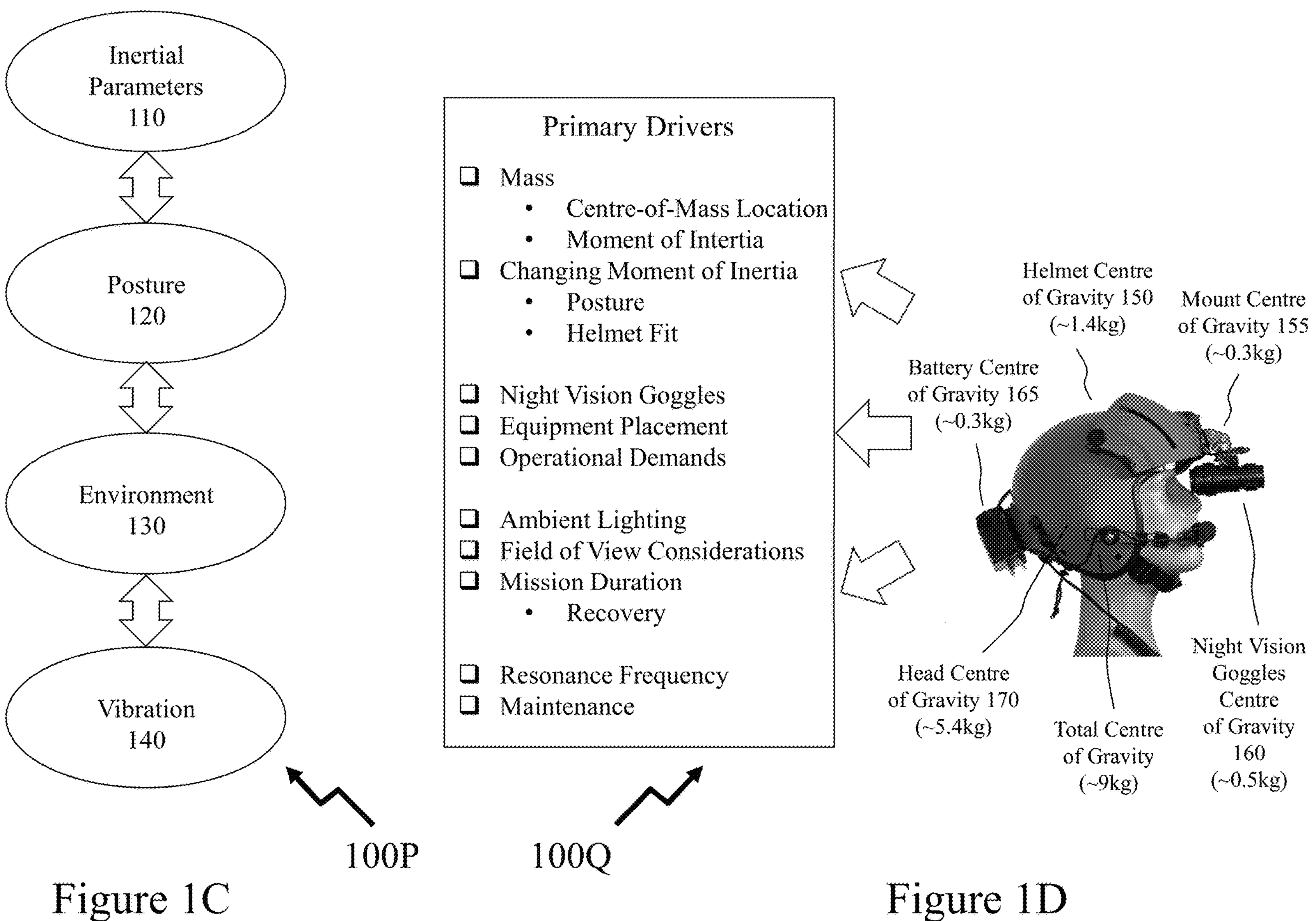
FIG. 1C depicts the operational factors leading to a user experiencing neck trouble through wearing a helmet with night vision goggles.
FIG. 1D depicts the typical centre of gravities for a user wearing a helmet with night vision goggles and the primary drivers impacting these centre of gravities.

Referring to FIG. 1C there are typical operational factors leading to a user experiencing neck trouble through wearing a helmet with night vision goggles. These factors being inertial parameters 110, such as rate(s) of rotation of the helmet with night vision goggles in different axes and the mass of the helmet with night vision goggles for example; the posture 120 of the user; environment 130 the user is within, e.g. motor vehicle, aircraft, helicopter, motorcycle, manufacturing; and the vibration 140 the user is subjected to.

Now referring FIG. 1D there are depicted the typical component centre of gravities for a user wearing a helmet with night vision goggles and the primary drivers impacting these centre of gravities. The resulting total centre of gravity being approximately 7.9 kg (~17.4 lbs). These components being:

- Helmet Centre of Gravity 150, approximately 1.4 kg (~3 lbs);
- Mount Centre of Gravity 155, approximately 0.3 kg (~0.66 lbs);
- Night Vision Goggles Centre of Gravity 160, approximately 0.5 kg (~1.1 lbs);
- Battery Centre of Gravity 165, approximately 0.3 kg (~0.66 lbs); and
- Head Centre of Gravity 170, approximately 5.4 kg (~11.88 lbs).

3D-VTAS Testing Methodology

In order to evaluate a 3D-VTAS according to an embodiment of the invention ten healthy male participants between the ages of 20-26 (23.1±2.2 years) with an average height of 182.00±6.5 cm and an average weight of 83.0±15.9 kg were selected from a population of university students. The inclusion criteria for participation required that subjects had normal color vision with or without corrective contact lenses, were free from acute or chronic neck pain. and other movement-related disorders. The Neck Disability Index and the Nordic Musculoskeletal Disorder questionnaire were administered to all potential subjects. None of the subjects who completed the study presented with any history of neck pain, neck trauma, whiplash injury neurological disease, impairment, or any type of musculoskeletal problems of the neck that required treatment in the period of at least 3 months. Prior to participating in the study all participants were provided information regarding the testing and completed consent forms approved by the University General Research Ethics Board

3D-VTAS Equipment

Figure 2:
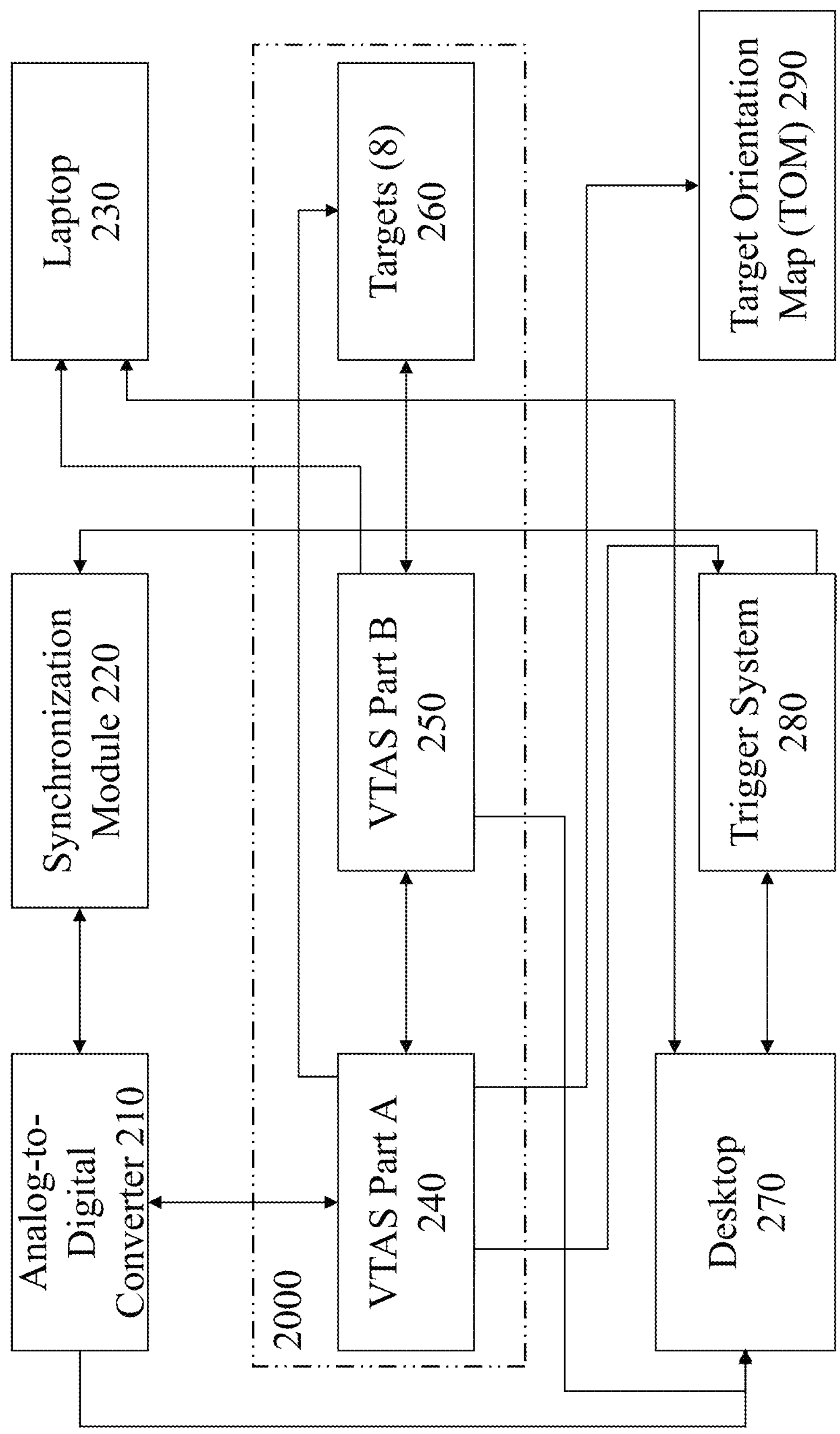
FIG. 2 depicts an exemplary architecture for a visual target acquisition system according to an embodiment of the invention.

Referring to FIG. 2 there is depicted a functional block diagram of a 3D-VTAS according to an embodiment of the invention. As depicted the functional blocks are established with respect to a 3D-VTAS-CORE 2000 according to an embodiment of the invention. As depicted the 3D-VTAS-CORE 2000 comprises a pair of modules, VTAS Part A 240 and VTAS B 250 together with a set of Targets 260, for example eight (8). The 3D-VTAS further comprises a first computer, e.g. Desktop 270, a second computer, e.g. Laptop 260, a Trigger System 280, a USB Hub 210, a Synchronization Module 220 and a Target Orientation Map (TOM) 290. Optionally, the Laptop 230 and Desktop 270 may be a single computing device, a single PED, or a single FED supporting the necessary communications. Optionally, each of Laptop 230 and Desktop 270 may be a PED or a FED within other embodiments of the invention. Optionally, links between the elements within the functional block diagram may exploit electrical communications, optical communications, wireless communications, serial communications, parallel communications, or a combination thereof provided that the communications achieve the required bandwidth, speed, timing accuracy, synchronization etc. required for the 3D-VTAS to operate. Communications between functional blocks may be synchronous, asynchronous or plesiochronous.

Figure 3A:
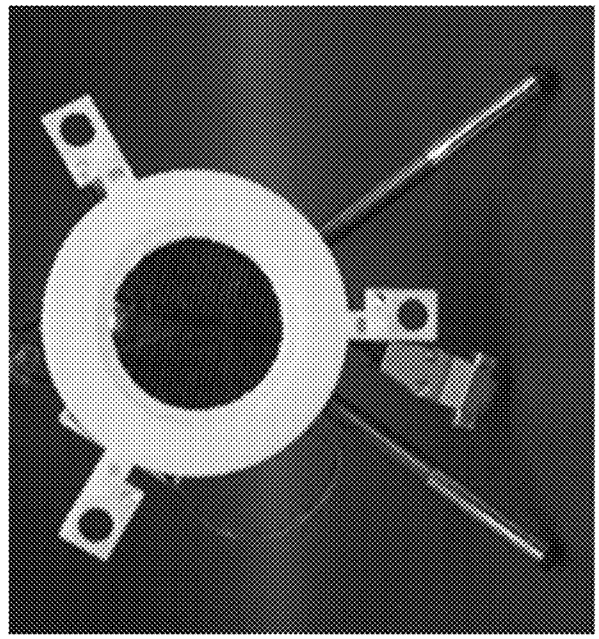
FIG. 3A depicts a solar panel, target holder with 60 mm aperture mounted on a mini tripod, and a target holder with a 20 mm offset mask forming part of a visual target acquisition system according to an embodiment of the invention.
Figure 3A:
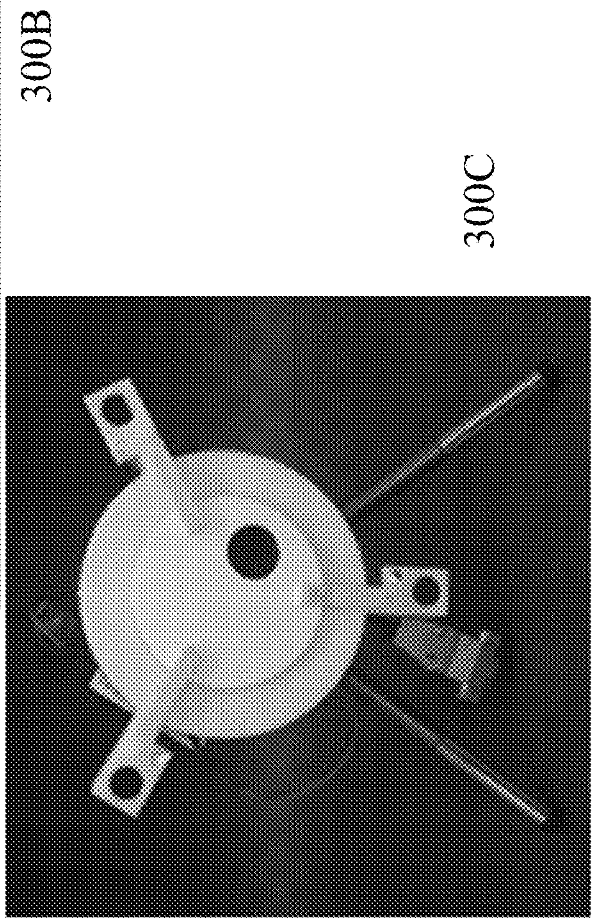
Figure 3A:
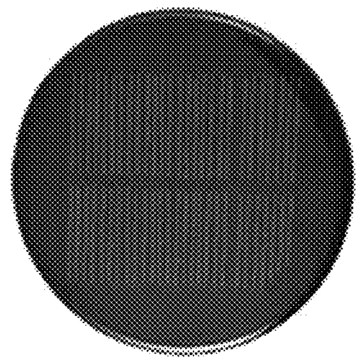

Within an embodiment of the invention the 3D-VTAS exploits a National Instrument Digital Acquisition (DAQ) device with Universal Serial Bus (USB) interface supporting 4 differential or 8 single-ended channels sampled at 20 kS/s with 14-bit analog digital converter (ADC) resolution. The Targets 260 are each a large area photodetector, for example solar cells, that provide the required target dimension either by employing multiple Targets 260 or a single Target 260 with different apertures. For example, the Target 260 may be circular, square or rectangular according to the mounting—orientation of the target mounts. Within an exemplary configuration the 3D-VTAS is employed to elicit interactive and reciprocally-based head movements with solar panel based targets arranged as a target pair in each of the 4 movement trajectories (MT). Referring to FIG. 3A there is depicted a discrete 100 mm diameter solar cell 300A together with first and second exemplary enclosures 300B and 300C circular employing tripod mounts. As depicted in first view 300B the 100 mm solar cell is covered with a 60 mm aperture to provide a 60 mm target whereas in second view 300C the 100 mm solar cell is covered by a 20 mm aperture to provide a 20 mm target.

Figure 4:
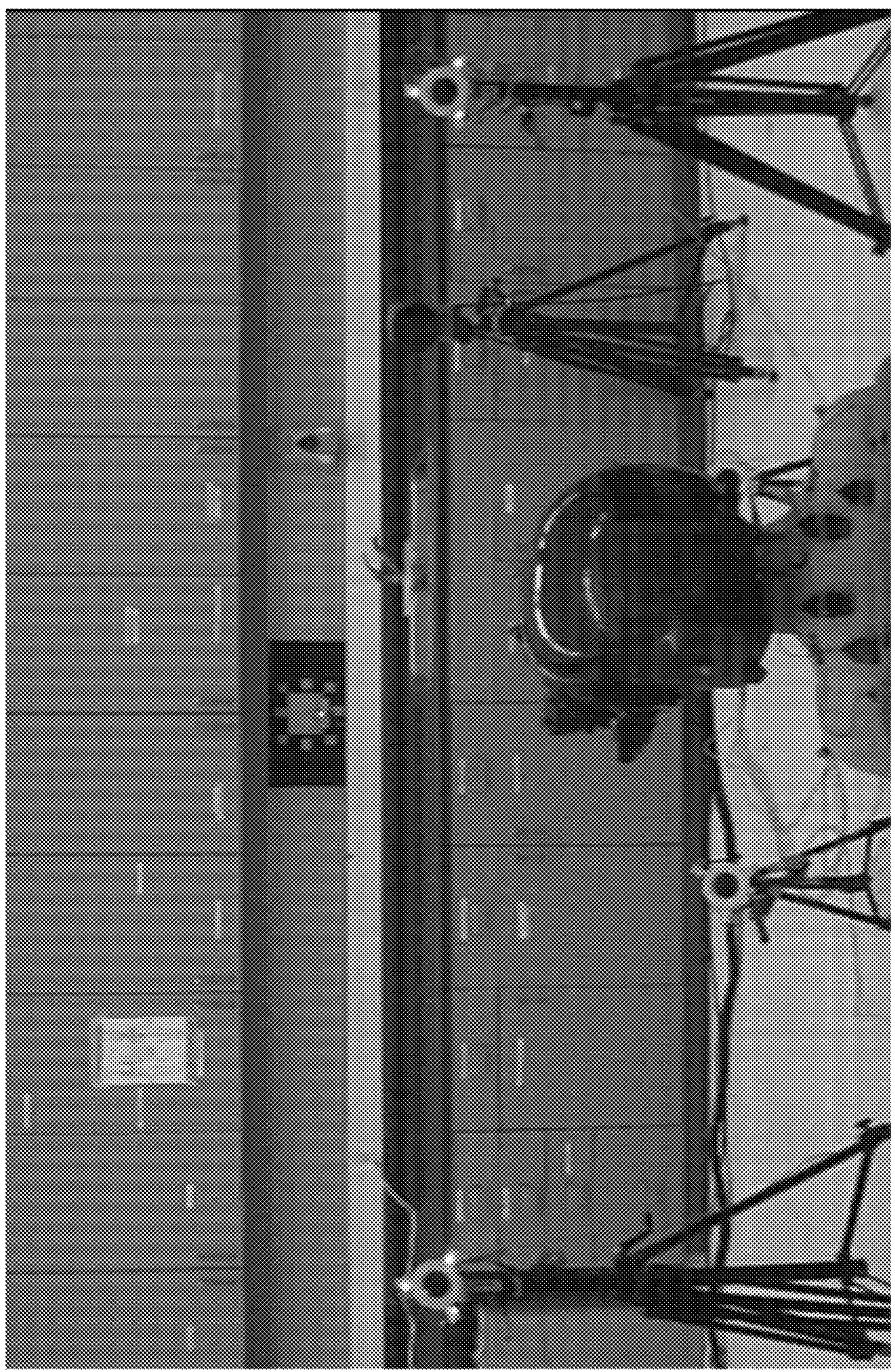
FIG. 4 depicts a participant within a study exploiting a visual target acquisition system according to an embodiment of the invention.

Each Target 260 also includes three multi-color, red-green-blue (RGB), light emitting diodes (LEDs). Optionally, each Target 260 may include a tripod or other mounting means to establish the Target 260 at the desired position relative to the test subject (user) or alternatively each Target 260 may be mounted to a tripod or other mounting means via an adapter. For example, each Target 260 may include an interface or adapter for a camera tripod or other commercially provided tripod or custom tripod. Accordingly, each Target 260 may be mounted in the correct relative locations with respect to the user such as depicted in FIGS. 4 and 5 respectively.

The initial set up for each Target 260 in terms of orientation and distance relative to the user was determined using precise two-dimensional mapping of the laboratory floor and overhead structures. The initial location of each target may be facilitated with the use of a laser measuring tool, laser pointer etc. For example, a laser measuring tool may provide for accurate angular position, e.g. a 70° angular spacing (±35° relative to the forward facing direction of the user). The relative 3D position and orientation of the individual targets in each of the 4 target pairs/movement trajectories were adjusted and verified to be a distance of 221 cm (±1 cm) and separated by an arc of 70° relative to each participants approximate seated eye height. A custom target alignment jig was attached to a metal headrest frame of an automobile bucket seat in order to verify the target placement and positioning.

Within other embodiments of the invention the Targets 260 may employ automated location positioning means via beacons for local position determination discretely or in combination with a global positioning system (GPS). Such local relative position determination may optionally, exploit, ultrasonic range determination or one or more other techniques including, but not limited to, visible optical, infrared optical, visible or infrared laser based optical, microwave, and radio frequency distance measurements.

Figure 3B:
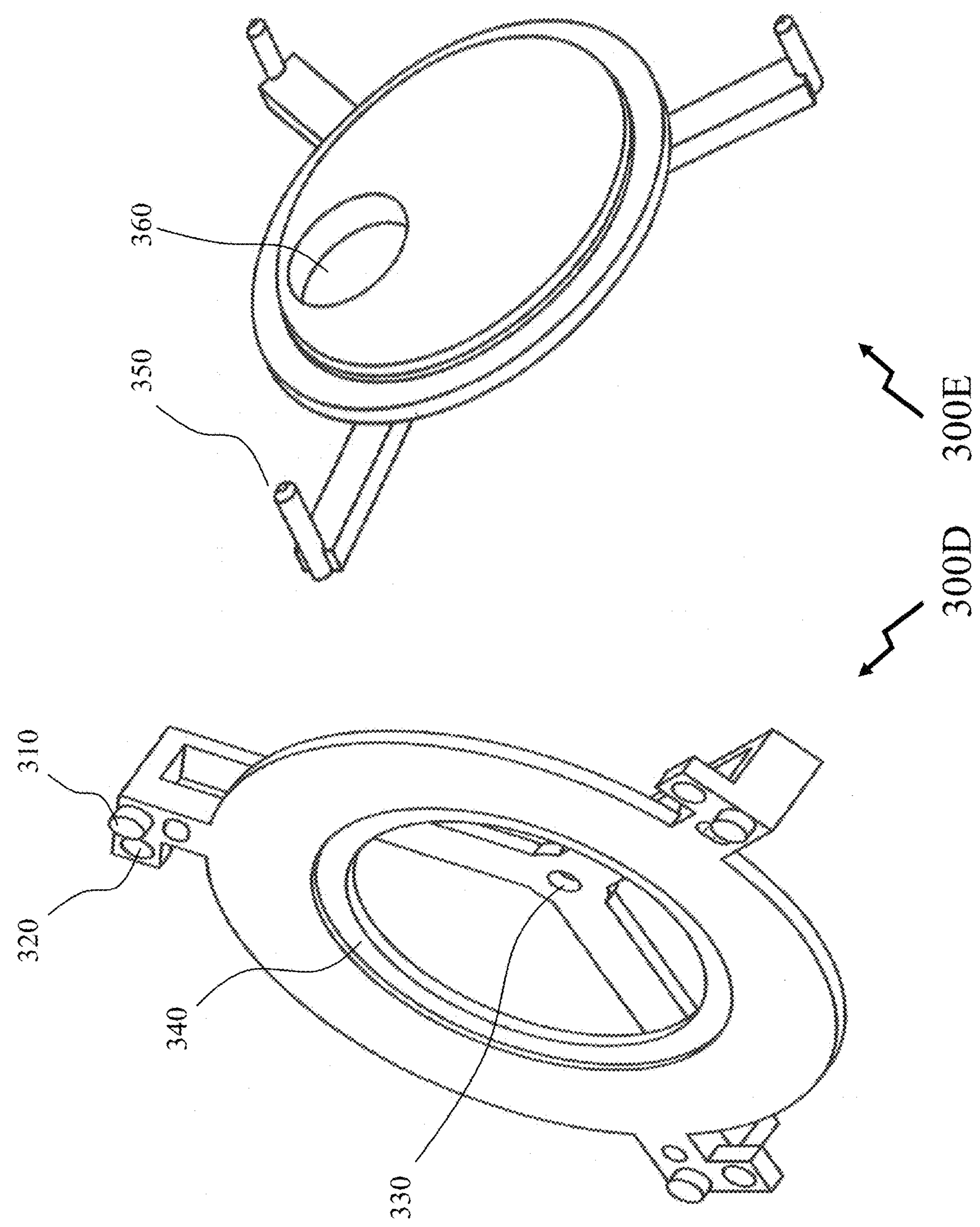
FIG. 3B depicts a solar panel holder with integrated LEDs and restricted offset aperture mask for a visual target acquisition system according to an embodiment of the invention.

Referring to FIG. 3B a housing for a circular solar panel is depicted in first image 300D comprising an annular mounting 340 for the solar panel, RGB LEDs 310, the aperture housing mountings 320, and a ¼"-20 threaded hole to accept a standard ¼"-20 camera mount threaded fastener. Second image 300E depicts an aperture housing comprising mounting pins 350 which engage the aperture housing mounting 320 within the mounting for the solar panel and the aperture 360. Accordingly, different aperture housing may provide different apertures 360 including different diameters and geometries. For example, a narrow vertical aperture would require accurate lateral angular positioning from the user but inaccurate vertical angular positioning. Alternatively, small diameter circular apertures for example would require high angular resolution of head position for the user whereas larger diameter circular apertures lower angular resolution of head position for the user. Optionally, a Target 260 may support multiple apertures via different aperture mountings of a single Target 260 may employ multiple discrete targets positioned relative to each other. Alternatively, multiple Targets 260 may be employed each with a fixed aperture.

Figure 5A:
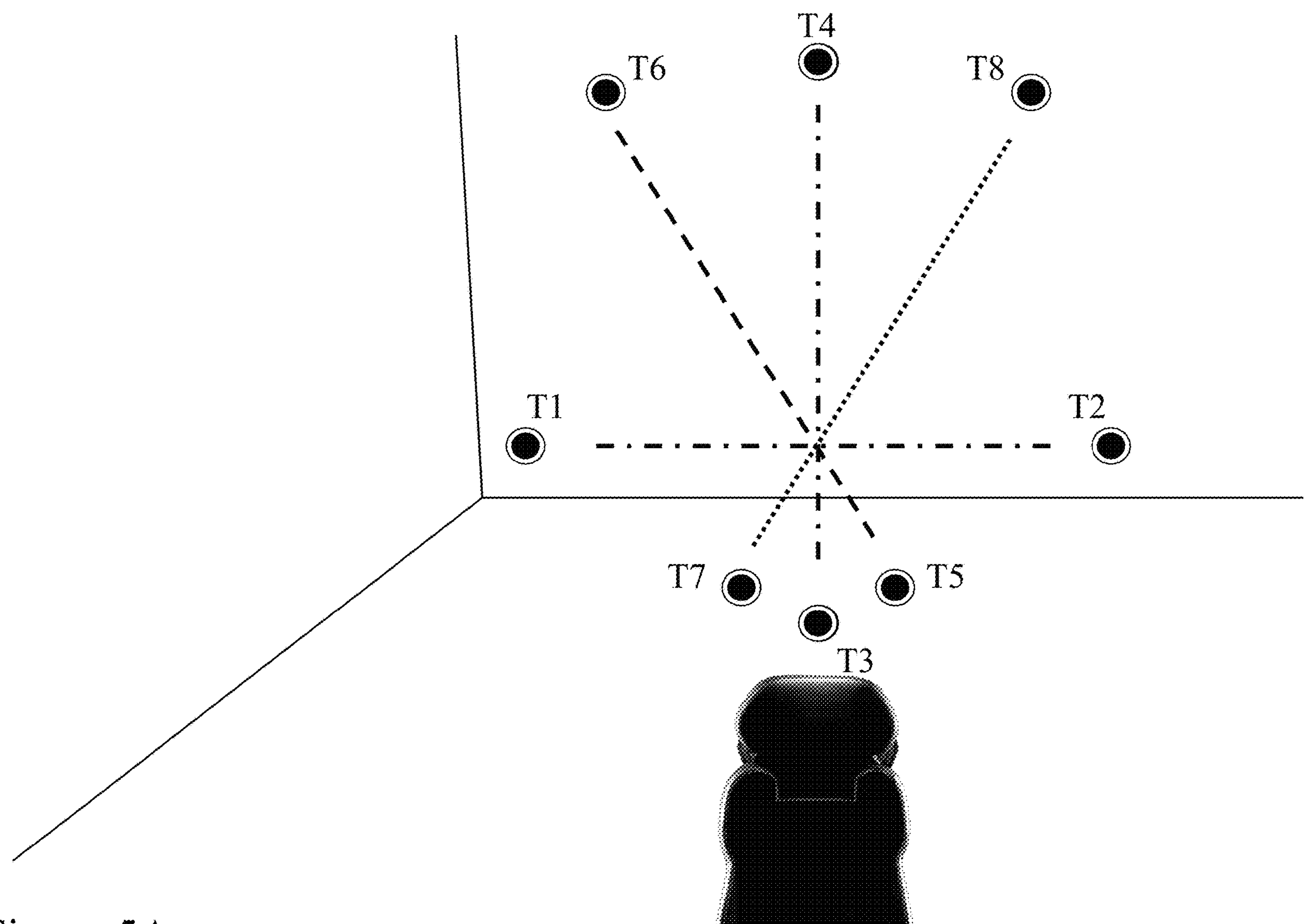
FIG. 5A depicts an exemplary configuration of eight visual targets in the 3D-space of a laboratory together with the four movement trajectory target pairs defined within this configuration for a visual target acquisition system according to an embodiment of the invention.

Within the experimental configuration presented in FIG. 5A the four movement trajectories were comprised as follows:

MTa—transverse plane (yaw);

MTb—sagittal plane (pitch);

MTc—diagonally upper left to center; and

MTd—diagonally upper right to center.

Figure 5B:
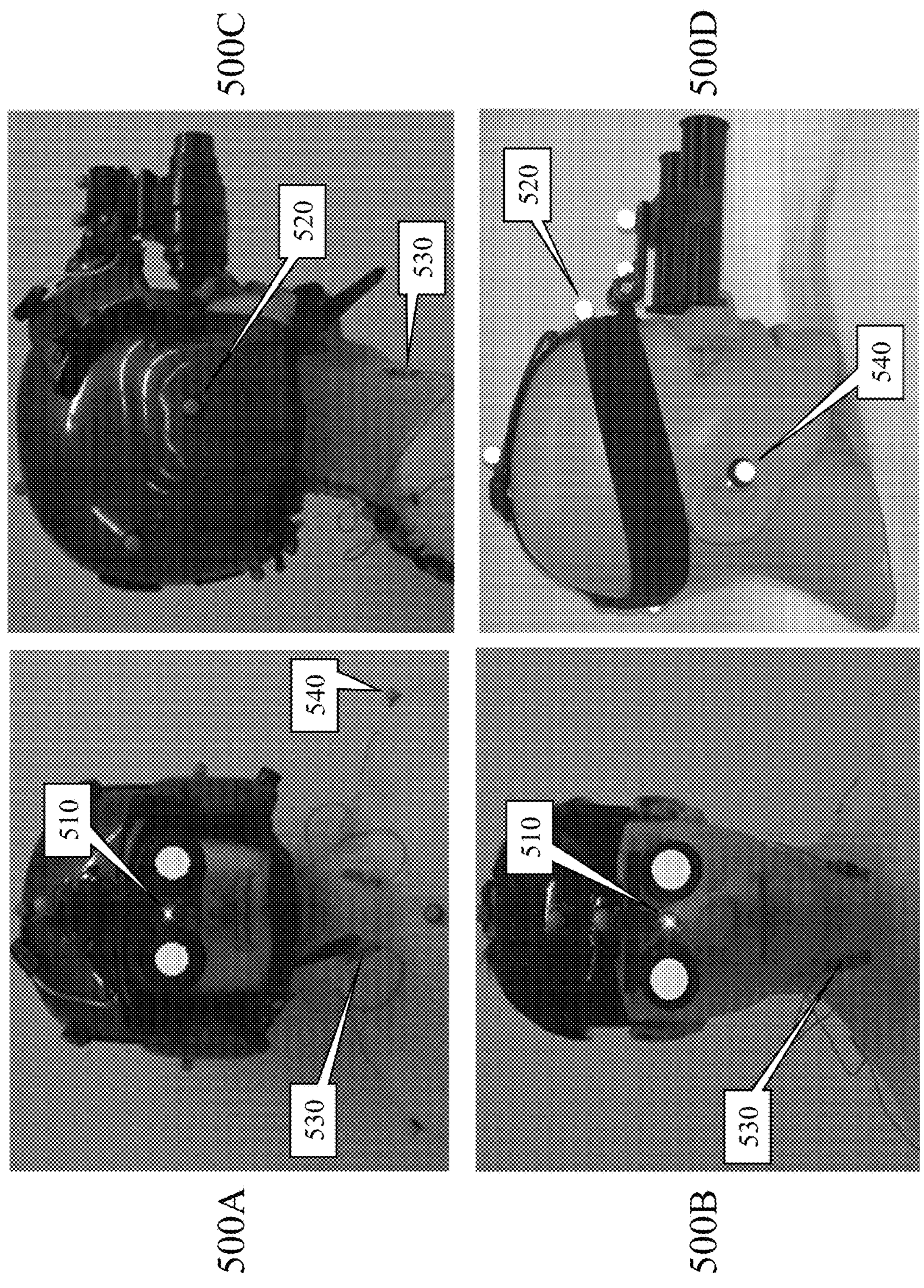
FIG. 5B depicts exemplary face-on and lateral views of users wearing night vision apparatus with and without helmets as supported by embodiments of the invention wherein the optical emitter is visible within the face-on views in the middle of the night-vision apparatus.

Referring to FIG. 5B there are depicted first to fourth images 500A to 500D respectively which depict, in first and second images 500A and 500B, forward facing views of users with and without a helmet wearing night vision apparatus and, in third and fourth image 500C and 500D, lateral views of the users with and without the helmet. In each of the first to fourth images 500A to 500D respectively the optical emitter 510 for illuminating the targets is visible clearly in the middle of the night vision apparatus. Also evident in first to fourth images 500A to 500D respectively are motion capture equipment-mounted reflective markers 520 and body-mounted reflective markers 540 together with biometric sensors 530.

Within the testing performed by the subjects each wore a GoPro™ head strap adjusted to fit with a custom mounting designed to hold a red laser pointer such that based upon the user's head movement they could establish interaction between their head-mounted laser pointer and the solar cell within each Target 360. Based upon control signals applied to each LED cluster within each Target 260 the user's activities could be triggered to target a specific Target 260 or Targets 260 in sequence. Accordingly, based upon timing information the acquisition for the solar cell photocurrent allows determination of the user illuminating the target. Optionally, this timing can also be associated with triggering a LED cluster color state (RGB) of a target to define it as the target the user should acquire thereby prompting the user rather than the user following a memorized target pattern or one presented via another means such as audio commands. Accordingly, in addition to monitoring user mobility etc. the system can also monitor/establish reaction times to commands visually indicated, audibly indicated etc.

In operation the system initializes all LED's on each target to be illuminated as red and remain so until the laser hits the solar panel. Upon detection of the laser, the 3D-VTAS triggers the LEDs on a single target to turn blue, and then green after the user targets the laser point continuously on the target for more than a predetermined period of time, e.g. 300 milliseconds. Accordingly, visual acquisition to the user is confirmed when the LEDs turn green. Hence, if the user is instructed to target the Target 260 illuminated with the LED red then they must turn their head to orientate the laser pointer onto the aperture and then receive visual confirmation of initial target acquisition (LED turns blue) and then subsequent confirmed extended acquisition (LED turns green). Within the embodiments of the invention presented a solar cell provides only that the target is illuminated. Optionally, the solar cell may be replaced with a quadrant photodetector providing additional information as to the quadrant of a circular target the user initially acquires and then their relative gross movement when the signal changes quadrants. This may be further refined through the use of a 2D CMOS sensor allowing not only acquisition to be initially established and continuously monitored but additional information regarding the user's head motion in maintaining the laser pointer onto the target may be acquired through the 2D CMOS sensor. Optionally, in other embodiments of the invention 1D CMOS arrays may be employed discretely or in combination or with other detector elements.

Figure 5C:
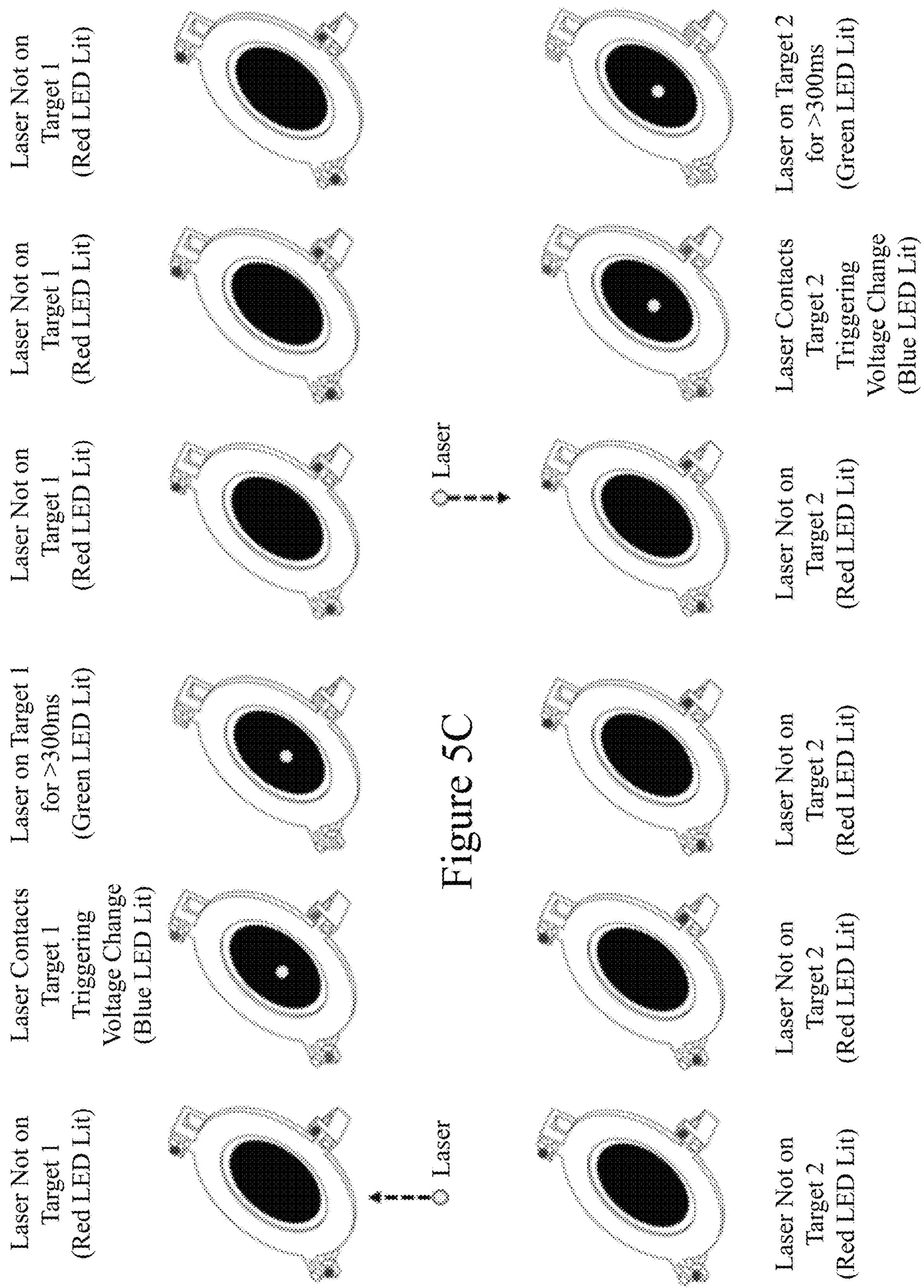
FIG. 5C depicts the typical sequence of a user targeting a pair of targets in sequence together with the visual indicators provided to a user through the use of red, blue and green LED signals within a system according to an embodiment of the invention.
Figure 5D:
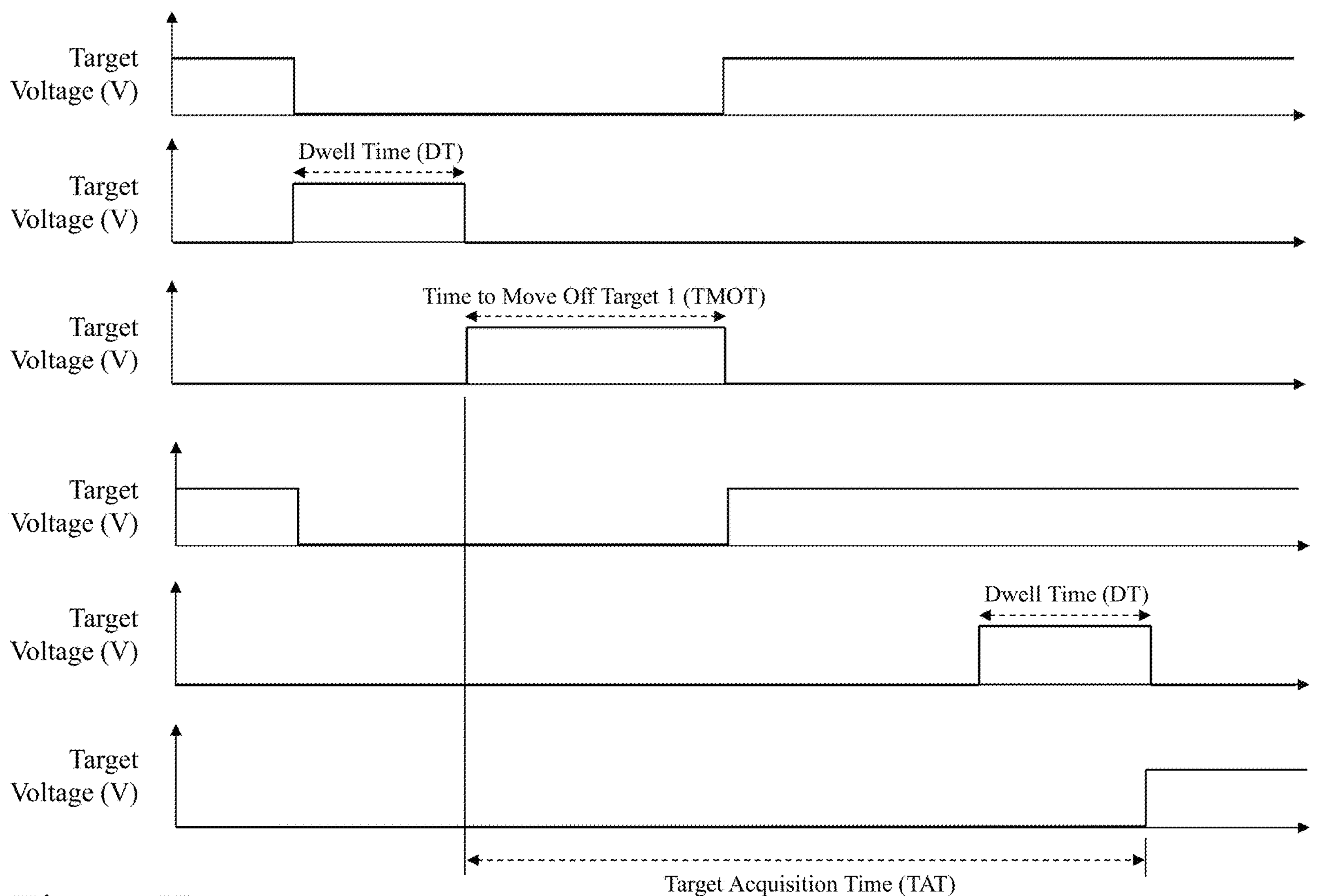
FIG. 5D depicts timing information for the sequence of the user targeting a pair of targets in sequence as depicted in FIG. 5C.

Referring to FIG. 5C there is depicted such a typical sequence for a user targeting a pair of targets in sequence together with the visual indicators provided to a user through the use of red, blue and green LED signals within a system according to an embodiment of the invention. FIG. 5D depicts the associated timing information for the sequence of the user targeting a pair of targets in sequence as depicted in FIG. 5C.

Whilst the embodiments of the invention are described and depicted with respect to use of a head mounted laser pointer it would be evident to one of skill in the art that the system may be configured for other motor functions—body elements such as wrist, arm, ankle, leg, etc.

The duration of the blue LED signal prior to the LEDs turning green was purposely designed by the inventors to account for the visual perception capability of humans. From the literature, it is well known that the perception of colour change for a visual stimulus has a range from 100 to 150 milliseconds, where ISO/DIS 17488 has established that reaction time less than 100 milliseconds is invalid or premature. Accordingly, by specifying and requiring that user remain on target for a period that was slightly longer than 200 milliseconds, e.g. 300 milliseconds, it would be evident that the user had perceived the change in colour from red to blue, and thus were aware whether they were on target prior to receiving a visual indication of successful target acquisition with the green LED.

The smaller target mask with a 20 mm aperture depicted in third image 300C in FIG. 3A and second image 300E in FIG. 3B was designed with an offset from the center of the solar panel in order to avoid an inactive region of the solar panels employed as evident in first image 300A in FIG. 3A. The index of difficulty (ID) for the 60 mm and 20 mm sized targets respectively is 6.49 and 8.07. For both target sizes the ID can be calculated by taking the ratio of the visual angle of the target size from a distance of 221 cm and the 70° angle between the center of each respective target pair or movement trajectory arc (MTA). The visual angle was determined using Equations (1) and (2) below.

$$VA_{60\ mm} = \tan^{-1}\frac{H}{x} = \tan^{-1}\frac{6\text{ cm}}{221\text{ cm}} = 1.56^\circ \tag{1}$$

$$VA_{20\ mm} = \tan^{-1}\frac{H}{x} = \tan^{-1}\frac{2\text{ cm}}{221\text{ cm}} = 0.52^\circ \tag{2}$$

According to Fitts (1954), the index of difficulty may be represented by Equation (3) where $W_a$ is the target width or tolerance range and A is the movement amplitude. For the purposes here, target width ($W_A$) and the amplitude (A) were defined as VA and MTA, respectively. Accordingly, the index of difficulty is calculated using Equation (4).

$$ID = \log_2\frac{2A}{W_A} \tag{3}$$

-continued $$ID = \log_2\frac{2\cdot MTA}{VA} \tag{4}$$

Retroreflective Target System Design

FIGS. 3A-3B, 4, and 5A-5B described above depict an exemplary 3D-VTAS system supporting embodiments of the invention. It would be evident that the configuration and components described and depicted in these Figures may be varied. Accordingly, the following describes another exemplary embodiment of the invention with respect to the three main components of the system, the head mounted laser data acquisition unit, target unit, and data processing unit, wherein this exemplary embodiment of the invention is targeted at a lower overall system cost and the evaluation of a user's motion/responsiveness in a manner relating to a typical average user rather than a pilot etc. Such a 3D-VTAS according to this embodiment of the invention would support evaluation of users for motion, responsiveness impairments arising from a range of sources such as illness, disease, injury, concussion, etc.

Head Mounted Laser Data Acquisition Unit

A visible laser, for example similar to a laser pointer such as an Adafruit Laser Module Product 1054 with length 31 mm and 10 mm diameter weighing approximately 6 g (~0.2 oz) (https://www.adafruit.com/product/1054), is mounted to a headband, and is pointed towards targets at some distance from the subject being tested. The laser is mounted such that the light emanates from a point equidistant from the subject's eyes, normal to, and within a few centimeters (an inch or so) of their forehead. For ease the headband may use Velcro™ or elastic force to maintain the position of the laser while the subject moves their head, directing the laser light to the various targets.

These targets may be made from a retro reflective material, for example 3M brand 7610, mounted, near a stimulus indicator such as an LED. When this stimulus LED is illuminated, the subject should quickly direct the laser to impinge on this nearby target. When the laser is properly directed onto the target, a substantial portion of the laser light is directed back towards the subject's eyes by the retroreflective material, and the target is perceived to get very bright. Some of this retro-reflected light is also captured by a lensed photodetector, pointed parallel with the laser path and located relative to laser, e.g. just above it or just below it. The detector may have a half-power viewing angle of around 10-20 degrees. An example of such a photodetector being an Optik Technology OP906 which is housed within a 3 mm package (https://www.digikey.ca/products/en?keywords=OP906) or an Osram SHF 213 which is housed in 5 mm diameter package (https://www.digikey.ca/product-detail/en/osram-opto-semiconductors-inc/SFH-213/475-1077-ND/607286). The detector may be enclosed in a housing of about 1-2 cm (0.5-1 inch) in length, that limits the detector's exposure to typical room lighting from the side. Housing the photodetector within a tube, for example having 5 mm diameter, allows the tube to support a small plastic filter mounted just in front of the photodetector, which blocks most wavelengths except that of the laser.

Optionally, a narrow band filter may be employed but for reduced cost the filter may be formed from wideband material such as Edmunds Optics #43-945 (https://www.edmundoptics.com/p/1quot-x-1quot-red-optical-cast-plastic-filter/5414/) or a Kodak Wratten #25 (https://www.edmundoptics.com/p/red-25-kodak-wratten-color-filter/10790/). An optical indicator such as an LED is mounted on a stalk or arm, for example 12 cm (approximately 4.75 inches) in length, which is in turn attached to the headband. This arrangement allows the status of the laser's movements to be indicated to the subject, in the periphery of the subject's vision whilst also placing all active elements of the 3D-VTAS into a single head mounted assembly with purely passive targets (where the user is provided with the indications through the headband mounted LED or LEDs) or active targets which are wirelessly coupled to the control/timing electronics which include one or more LEDs. The LED may for example be a single colour LED (e.g. https://www.adafruit.com/product/298) or tricolor (e.g. red, green, blue) (e.g. https://www.adafruit.com/product/159).

Within an embodiment of the invention mounted towards the back of the subject's head on the headband is a small microprocessor that supplies power to the laser, sends the stimulus signals to the target processor, receives the photodetector signal, drives the status indicator, and collects and disseminates timing information about the subject's movements. For example, the microprocessor may execute a program written in C or C++ and typically designed using the Arduino IDE, although many other languages and development environments could be used. This battery operated microprocessor may also provide the wireless connection to the targets with their stimulus LED indicators, and an output to a processing unit (PU). This PU may for example be an Adafruit Feather Huzzah ESP8266 (https://www.adafruit.com/product/2821) powered by a 2000 mAh 3.7V Lithium Polymer battery (e.g. https://www.adafruit.com/product/2011). Optionally, the battery can be charged through a USB port connection which is also used to pass the data collected by this head mounted device on to the data processing unit. Optionally, different electrical interfaces may be employed for the charging and data communications. Optionally, within another version of the 3D-VTAS system the data is sent in real-time by a wireless connection (e.g. Wi-Fi) to a PED or FED running the data processing program. Alternatively, the data can be stored on a removable storage card similar to a SD card and transferred to the data processing unit for analysis.

Target Unit

Within an exemplary configuration the target holders are styled along the lines of a popup display stand with a screen such as used in stores, displays, etc. (for example https://www.postupstand.com/all-products/banner-stands/pop-up/quick-fabric-display-59-75-x-88.html) to which multiple retroreflective based targets of various diameters may be attached. Each retroreflective target may exploit a retroreflective film, such as 3M #7610, together with stimulus LEDs in active configurations or absent them in passive configurations. The stimulus LEDs on the display or headband are used to direct the subject to point at the next target. Other retroreflective materials may include, but not limited to, 3M Scotchlight #8910 (haps://www.safetyeffects.com/p-21-3m-scotchlite-reflective-material-sdver-with-cotton-polyester-backing.aspx) and 3M Scotchlight #7610 (https://www.jtsoutdoorfabrics.com/Scotchlite-8710-Silver-Transfer-Film-Iron-On_p_16341.html) which is transferred to a fabric backing with iron-on heat.

Within configurations where the stimulus LEDs are associated with the retroreflectors these may for example be a string of Adafruit Digital RGB LED Pixels coupled to a WS2801 style driver chip (see for example https://www.adafruit.com/product/738, https://www.adafruit.com/product/322) or DotStar pixels with integrated driver chip (https://www.adafruit.com/product/2343) which employ a Serial Peripheral Interface for control. The array of targets may be coupled to a local controller (e.g. another Adafruit Feather Huzzah ESP826) which communicates wirelessly to the head mounted processor. Such a controller may similarly be coupled to a battery for power.

Alternatively, a processor upon the display may be employed to directly drive discrete LEDs which are wired directly to the output pins of the microprocessor, similar to the status indicator LED described for the head mounted unit. These may be multiplexed to provide for driving a larger number of LEDs than the number of output pins available on the microprocessor.

Data Processing Unit

The data processing unit gathers the data generated by the head mounted unit which can be sent to this unit, either through a wireless connection (e.g. Wi-Fi, Bluetooth) or through a wired connection (e.g. USB connection). The data processing unit analyses the gathered data and generates the necessary report(s). The data processing unit may for example be a Microsoft Windows computer, an Android PED or FED, a smartphone, or any PED/FED capable of receiving the gathered data, processing it and generating the report(s).

Experiment Design and Protocol

A 2×4×2 mixed model repeated measures design was used to determine the influence of between independent variable, experimental session day, and the two within independent variables tested, namely the 4 movement trajectories (MTa, MTb, MTc, and MTd) and 2 target sizes (60 mrn vs. 20 mm). The presentation of the 8 targets, Target 260, within conditions to each participant was randomized to minimize the chance of order effects occurring throughout the study. Subjects were required to complete 4 trials for each condition with one minute of rest between each trial. For each trial the subject was instructed to successfully acquire, approximately 16 seconds, as many targets as possible in a reciprocal fashion until the system timed out. Two sessions were completed by each subject using the same block randomized set of 8 conditions. Each session was separated by at least one week. For the duration of the experimental protocol, each participant positioned themselves in an unrestrained seated posture and for each trial was instructed to re-direct their gaze and move their head as rapidly as possible in a continuous and reciprocal manner for a period of 16 seconds and until the system timed out. Additionally, participants were made aware of the inactive region on the solar panel in the 60 mm full panel tests that would need to be avoided in order to successfully acquire the targets.

Before visually acquiring the targets in a reciprocal manner along the movement trajectory, the participant was instructed to maintain their gaze and head position stationary in a neutral head posture directed at the target orientation map (TOM). The TOM displayed the relative positions of the respective movement trajectories for each target pair and was mounted on the wall approximately 3.5 m directly in front of the subject. Prior to experimenter running the VTAS program for each respective trial, the movement trajectory and targets to be acquired by the participant were verbally called out. For each movement trajectory, participants were instructed to always first acquire target 1, target 4, target 6, and target 8 for MTa, MTb, MTc, and MTd, respectively. Additionally, participants were provided with a visual signal, which indicated the start of the trial, via a tightly grouped cluster of three RGB LEDs within the TOM. which was positioned just below the participant's field of view. Simultaneously, as the 3D-VTAS initialized and the cluster of three RGB LEDs on the respective target pair turned red, the TOM LED's turned green.

Prior to participating in the study each subject completed a 10 minute controlled warm up including 5 minutes of stationary cycling (125 Watts@80 rpm) followed by 5 minutes of dynamic and static neck/shoulder stretching.

Each subject was seated relative to the lab coordinate system so that the X-axis was anterior-posterior, the Y-axis was horizontal, and the Z-axis was which corresponds to roll, pitch, and yaw motions of the head, respectively. Prior to collecting data, subjects completed 16 practice trials to become familiarized with the experimental protocol and eliminate potential learning effects. 3D-VTAS data were recorded with Qualisys Track Manager (QTM) software in execution upon the Desktop 270 via a USB interfaced Analog-Digital Converter board.

Exemplary performance metrics include the dwell time (an aspect of system performance) as well as the following human performance metrics:

Time to Move Off target (TMOT);

Target Acquisition Time (TAT), referred to a TATx where x is the target number; and Error Index, determined by the ratio of the LED rising edges (RE), e.g. $\Sigma BlueLED_{RE}:\Sigma GreenLED_{RE}$.

FIG. 8A depicts the dependent variables together with the independent variables as well as the statistical analysis from an Analysis of Variables (ANOVA) together with the results of F-test on these factors.

Evaluating System Validity and Performance

Following the second data collection session: each participant's perspective on the usability of the 3D-VTAS was queried through a 5-point Likert-based qualitative survey. The administered survey included five questions that were designed to assess each participant's perspective on the ability of the system to assess neck function: visual perception capabilities, and the performance effects of target size and the inactive region on the solar panel. Part of this survey is depicted in FIG. 8B.

Data Analysis

Four VTAS dependent variables were calculated using a custom MATLAB™ algorithm. The four VTAS dependent variables were calculated, as follows:

1) mean dwell time (DT) calculated as the duration of the blue LED signal just prior to a successful target acquisition;
2) mean target acquisition time (TAT), calculated as difference in time between the rising edge of the green LED signal of a start target and the rising edge of the green LED signal of the goal target;
3) mean time to move off target (TMOT), calculated as the duration of the green LED signal; and
4) mean error index (EI), calculated as the ratio of the number of rising edge blue LED signals to the number of rising edge green LEDs signals.

With the exception of the error index, the mean for each dependent variable within each respective condition was calculated by summing the durations of each dependent variable across trials and dividing by the numbers of instances in which the dependent variable occurred across trials. Mean EI was calculated by first determining the sum of the number of rising blue LED edges and the sum of the number of rising green LED edges across the four trials completed. Rising blue LED edges that followed the last successful target acquisition were not included in the calculated sum for the number of rising blue LED edges. The ratio of these respective sums were calculated, as the mean EI.

Figure 6:
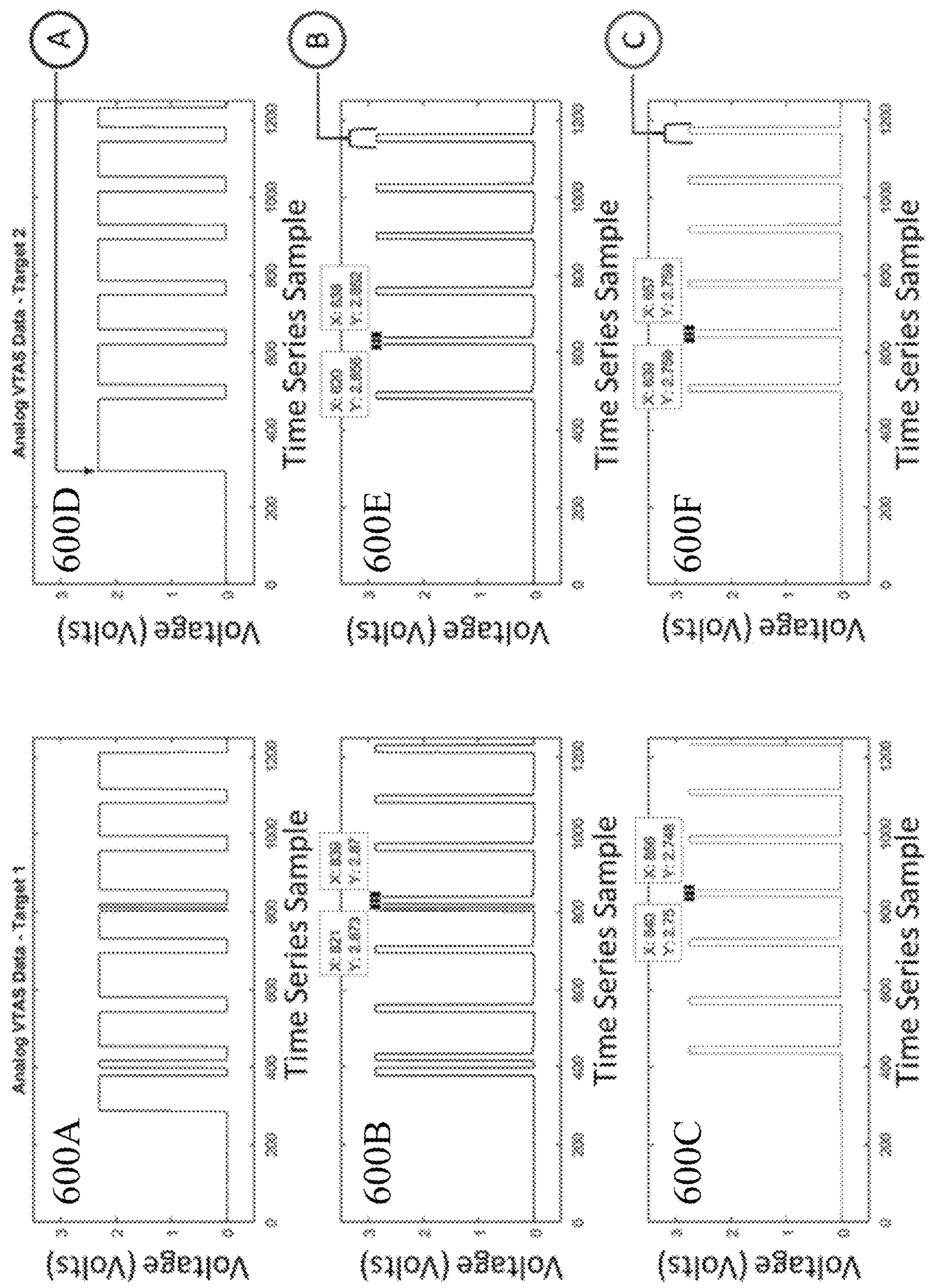
FIG. 6 depicts post-processed LED timing information for red, blue, and green LED signals as displayed within MATLAB for target 1 and target 2 of each respective movement trajectory condition; namely visual target acquisition system initialization and illumination of the red LEDs on both targets from acquired red LED signals, timing interval, subsequent to successful target acquisition, from blue LED signals used to calculate dwell time (DT), and timing interval for acquired green LED signals used to calculate time to move off target (TMOT) exploiting a visual target acquisition system according to an embodiment of the invention.
Figure 7:
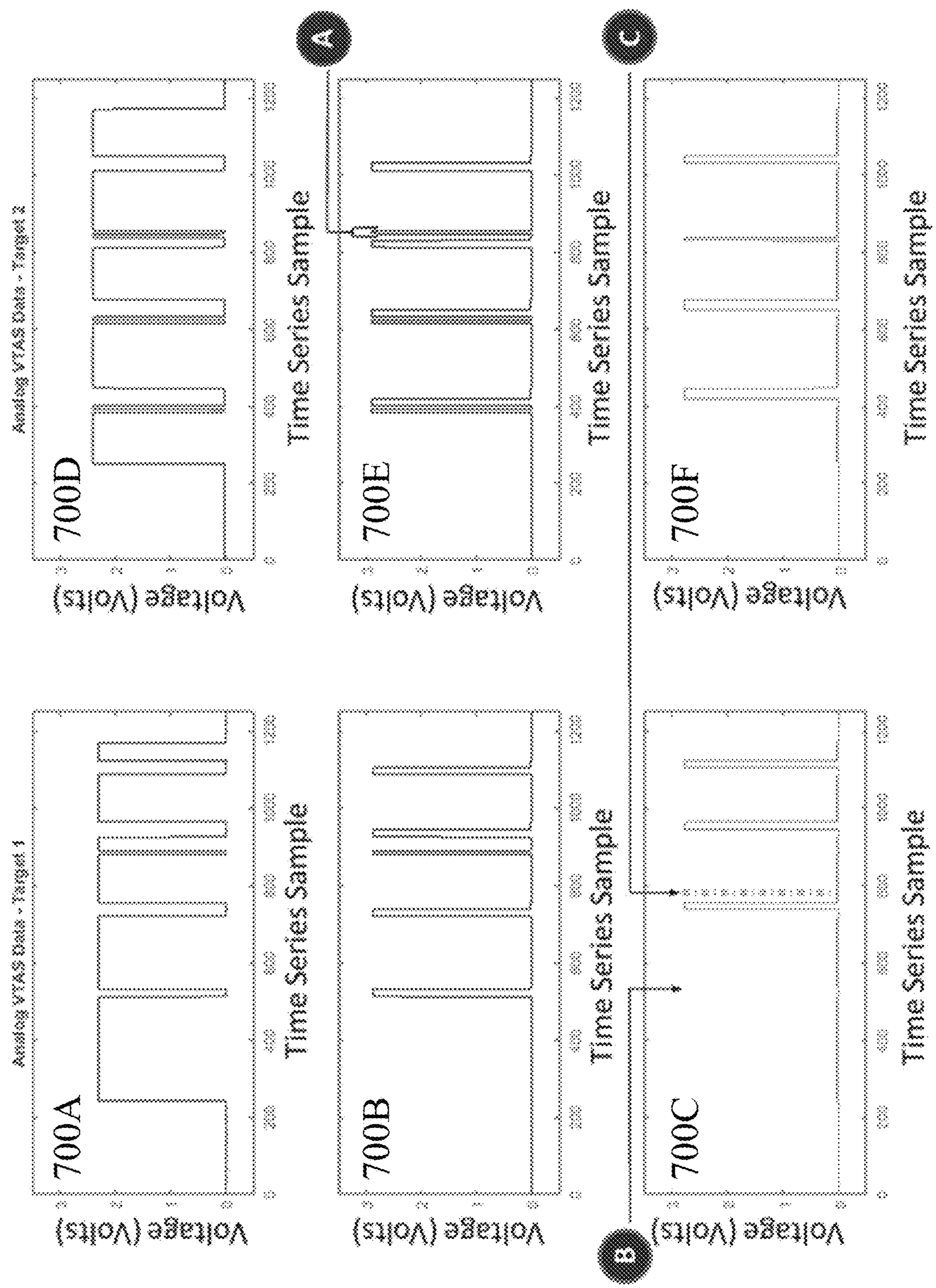
FIG. 7 depicts examples of acquisition error types associated with re-attempt error (A), acquisition failure error (B) and re-acquisition error (C, simulated) within a visual target acquisition system according to an embodiment of the invention.

As part of the data analysis process for each trial, the recorded RGB LED signals for each target were graphically presented in six plots, see for example FIG. 6 with first to sixth graphs 600A to 600F and were visually examined for acquisition errors, see for example FIG. 7 with first to sixth graphs 700A to 700F. Three different types of acquisition errors were identified, as follows:

1) re-attempt errors, where the participant attempted to re-acquire the goal target immediately after successfully acquiring the same target;
2) re-acquisition errors, where the participant had successfully acquired the goal target immediately after acquiring the same target; and
3) missed target acquisition errors or failures, where the participant believed he had acquired the target, but had not yet achieved a green LED signal, which indicates successful acquisition of the goal target before attempting to acquire the reciprocal target in the movement trajectory.

Based on secondary analysis, the first and second error types did not substantially alter any of the dependent variable outcomes. However, the third error type in which participants failed to successfully acquire the target, in some cases, substantially altered the mean TAT. To ameliorate the effects of this error type, all trials were re-analyzed using the same MATLAB algorithm with a slight variation to facilitate the detection of failed target acquisitions. The mean TAT for a condition was re-calculated if a missed target acquisition was visually identified and if the trial(s) had TATs that exceeded a predefined threshold of 1.65 times the trial TAT mean Target acquisition times that met the aforementioned criteria were excluded and the mean TAT for that particular condition was re-calculated.

Statistical Analysis

From a test-retest reliability perspective, the inventors postulated that movement time using the 3D-VTAS would provide high between-day reliability results, as determined using intraclass correlation coefficients (ICCs) To account for systematic and random error, the random effects, two-way, absolute agreement $ICCs_{(2,1)}$ were calculated for this study using IBM's Statistical Package for the Social Sciences (SPSS) software. Higher ICC values were anticipated to be reported for sagittal and transverse plane movements, as motions in these planes were postulated to require the control of fewer degrees of freedom in the cervical spine.

Given the robustness of Fitts' Law, it was hypothesized that movement time or target acquisition time would be significantly different and vary linearly according to the 2 index of difficulty levels (6.48 vs 8.07). It was hypothesized that the duration of movements for the 2 off-axes or diagonal movement trajectories would be significantly longer than the other movement trajectory planes (sagittal and transverse). As well, it was hypothesized that there would be no significant differences between day 1 and day 2 for any of the dependent variables of interest, as verification that movement trajectory and target size do not confound between day repeatability The significance of the independent variables (day, movement trajectory, target size) on the four dependent variables of interest was determined from a repeated measures analysis of variance (RM-ANOVA). All statistical testing was completed using a priori significance level of 0.05 in SPSS and Greenhouse-Geisser corrections were applied when the data did not meet the sphericity assumption, according to Mauchly's test of sphericity. When a significant main effect for an independent variable was detected, Bonferroni corrected pairwise comparisons were applied post hoc. Significant interaction effects that were found between the independent variables were also evaluated using Bonferroni corrected pairwise comparisons. For each RM-ANOVA performed there were 4 levels of interactions and 3 levels of main effects that were assessed for statistical significance.

Aside from mean target acquisition time, three other dependent variables were explored: mean dwell time (DT); mean time to move off target (TMOT); and mean error index (EI). Additionally, the standard error of measurement was also calculated for each dependent variable, as the square root of the mean square error term from the RM-ANOVA.

Results

System Performance and Dwell Time

For the 3D-VTAS, acceptable system performance and reliability criteria for dwell time were based on the limits of visual perception capability for humans. From the literature, it is well known that the perception of colour change for a visual stimulus is 100 to 150 milliseconds. Therefore, the system performance of the 3D-VTAS was deemed acceptable, as the mean of the minimum dwell time for all trials was greater than 200 milliseconds and the mean difference between the mean minimum and maximum dwell times were less than 150 milliseconds. Based on approximately 640 trials, the calculated mean minimum dwell time of 344.32±8.54 milliseconds (0.34 seconds±8.54×10−3 seconds) and the mean dwell time difference (mean maximum DT−mean minimum DT) of 44.96±15.45 milliseconds (0.045 seconds±0.015 seconds) was below the predefined acceptability criteria. Additionally, a RM-ANOVA for dwell time did not generate any significant main or interaction effects between conditions.

To better understand how the inactive region on the solar panel impacted participant performance, the inventors asked participants to provide a rating, see questionnaire example in FIG. 8A, on a five-point Likert scale (left anchor negligible effect and right anchor large effect) in response to the question "What effect did the dead spot on the solar panel have on your performance in successfully acquiring the 60 mm target?". On average, participants provided an overall rating of 4.1, which is slightly higher than the "moderate effect" interval. Conversely, when participants were asked the same question for the 20 mm target, on average participants provided an overall rating of 1.9, which is slightly lower than the negligible effect interval (left anchor no effect and right anchor large effect). Given the higher index of difficulty associated with acquiring the 20 mm targets, as expected, participants found that the 20 mm target had a moderate to large effect (4.4) on their performance. Overall participants found that the 3D-VTAS was effective at assessing their neck function (4.4) and their visual perception capabilities (4.4).

Repeatability of Performance-Based Dependent Measures

Calculated intraclass correlation coefficients (ICCs), between day one and two data collection sessions, for the 60 mm sized target across dependent variables ranged from poor to fair (see FIGS. 8C to 8E respectively). For the 20 mm sized target, ICCs ranged from fair to excellent across dependent variables. Calculated standard error of measurement values ranged from 0.032 to 0.335 seconds across dependent variables.

Main and Interaction Effects of Day on Performance

Figure 9:
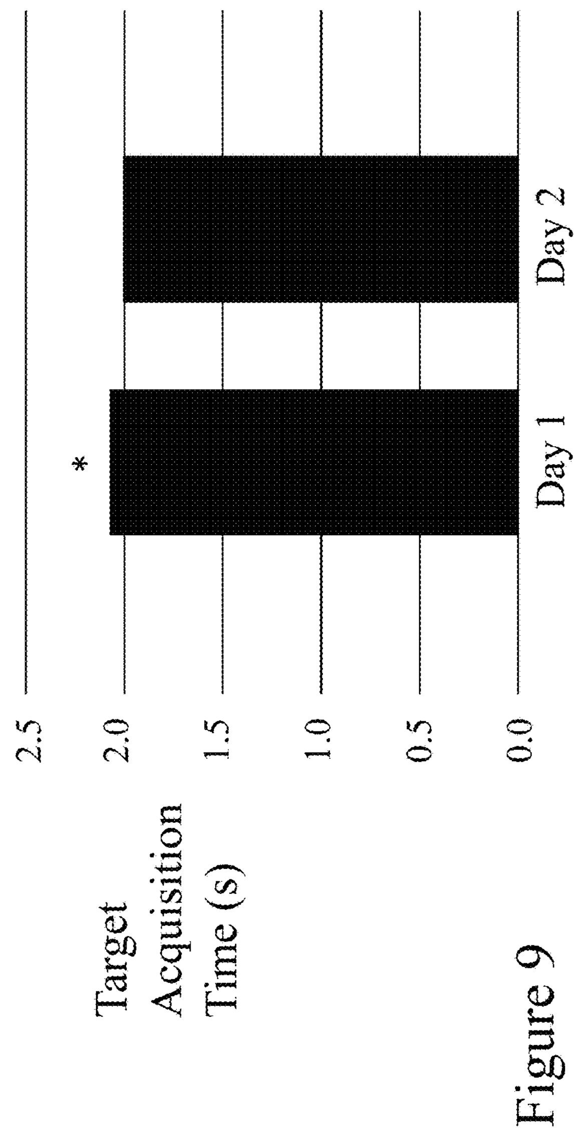
FIG. 9 depicts results for subjects on different days for mean target acquisition time obtained with a visual target acquisition system according to an embodiment of the invention.

For mean TAT, a significant effect of day ($F(1,9)=6.414$, $p=0.032$, $\eta 2=0.416$) was found. A 94 millisecond or 4.57% improvement in acquisition time emerged between the first and second data collections sessions (FIG. 9).

For mean TMOT, a main effect of day ($F(1,9)=12.369$, $p=0.007$, $\eta 2=0.579$)F(1 112-0.579) and a interaction effect of day and movement trajectory ($F(2.393, 21.541)=0.098$, $p=0.025$, $\eta 2=0.313$) were found. For TMOT, the interaction effect between day and movement trajectory revealed a differential decrease between the first and second data collection sessions where the decrease for MTa was larger than that of MTc by 28 msec or 18.8%.

Figure 10:
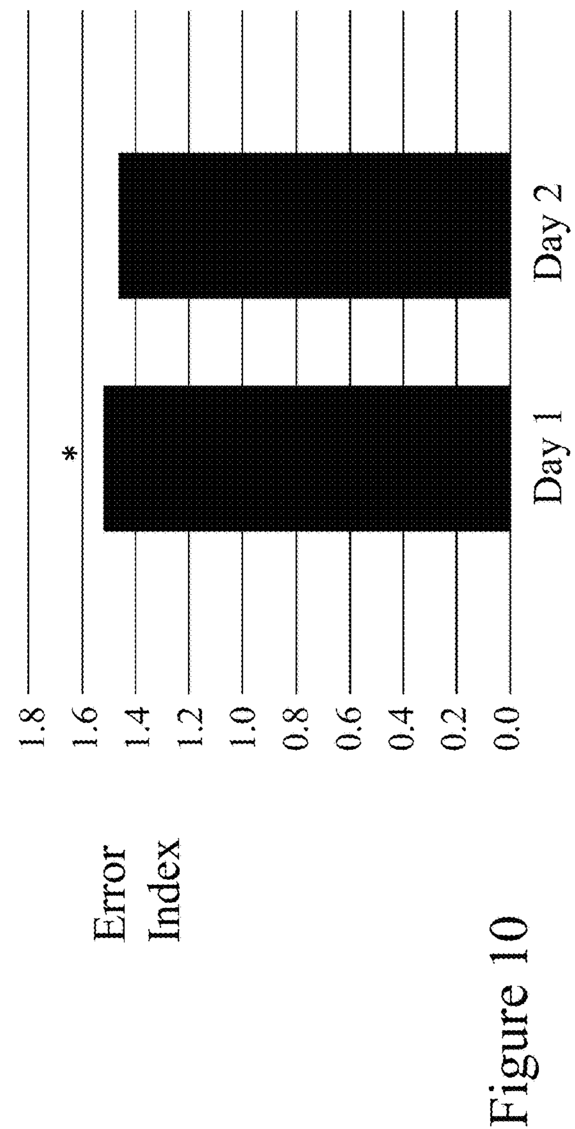
FIG. 10 depicts results for subjects on different days for mean error index obtained with a visual target acquisition system according to an embodiment of the invention.

For the mean error index, a main effect of day ($F(1,9)=5.166$, $p=0.049$, $\eta 2=0.365$)) was found. For mean EI there was a 4.58% reduction in the frequency of errors between the first and second data collection sessions (FIG. 10).

Effects of Movement Trajectory and Target Size on Performance

Figure 11:
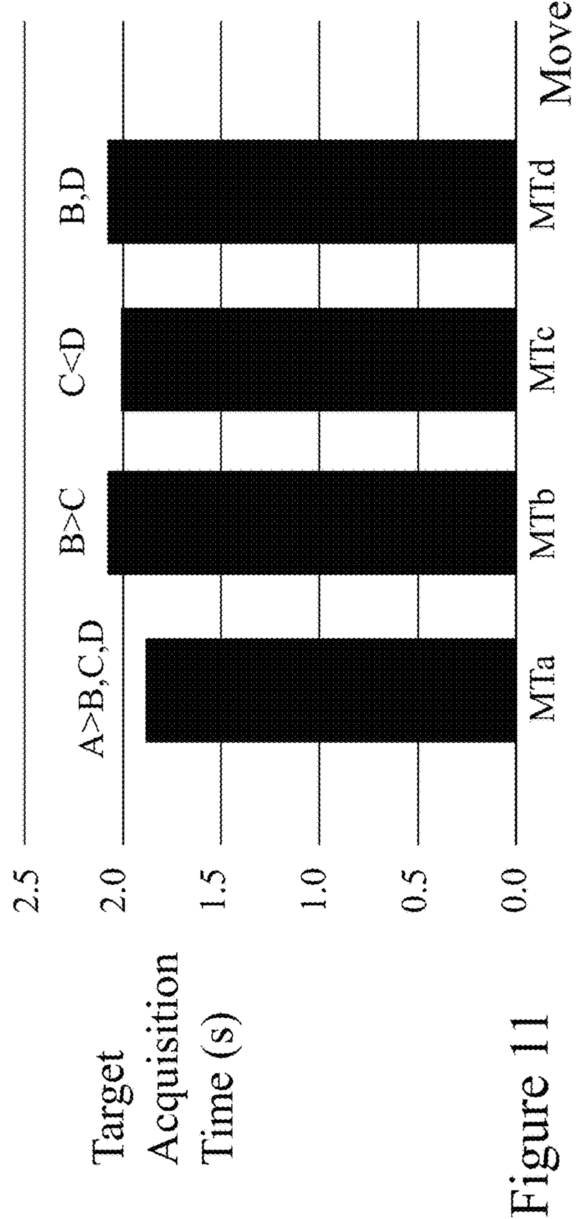
FIG. 11 depicts results for subjects for movement trajectory on mean target acquisition time obtained with a visual target acquisition system according to an embodiment of the invention.

For mean TAT, a main effect of movement trajectory ($F(3,27)=27.198$, $p=0.049$, $\eta 2=0.751$)) was found (FIG. 11). The mean TAT for MTa was lower than MTb:MTc, and MTd by 10.52%, 6.54%, and 10.09%, respectively. The mean TAT for MTb was lower than MTc by 3.65%, while MTc was lower than MTd by 3.34%.

Figure 12:
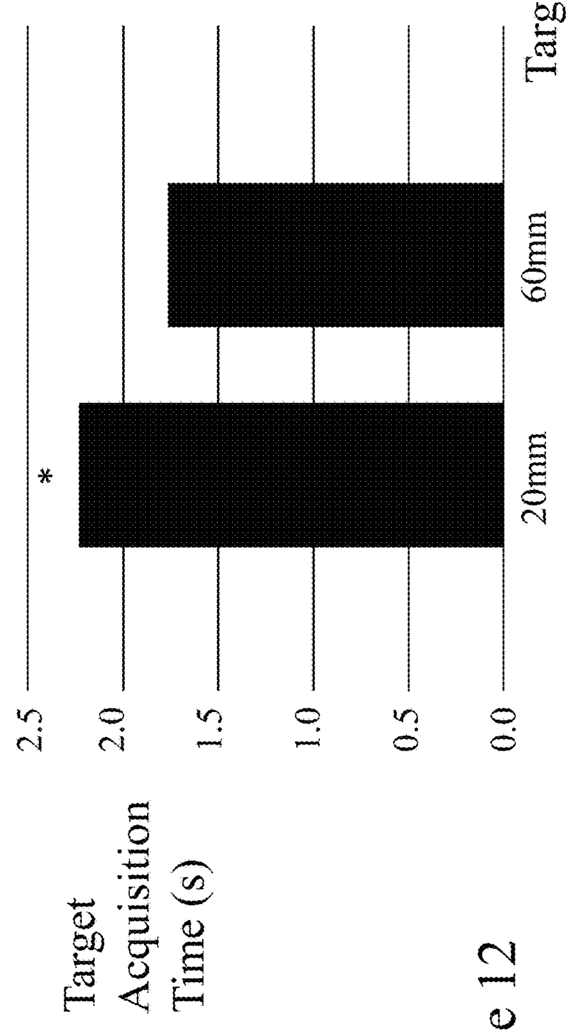
FIG. 12 depicts results for subjects for effect of target size on mean target acquisition time obtained with a visual target acquisition system according to an embodiment of the invention.

For mean TAT, a main effect of target size ($F(1,9)=213.087$, $p<0.001$, $\eta 2=0.959$)) was found. The mean TAT for the 20 mm diameter target was 26.45% longer in comparison to the 60 mm diameter target (FIG. 12).

Figure 13:
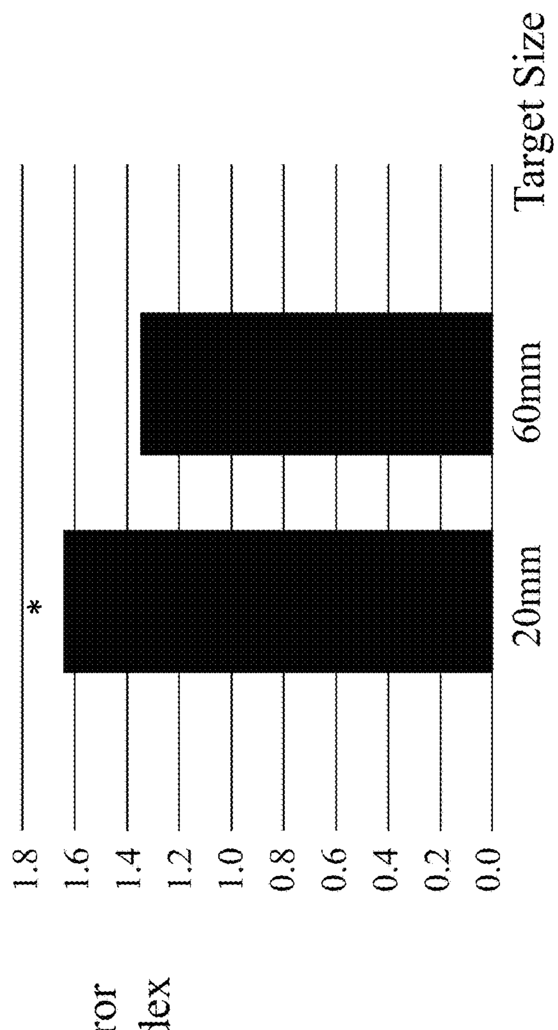
FIG. 13 depicts results for subjects for effect of target size on mean error index obtained with a visual target acquisition system according to an embodiment of the invention.

For the mean error index, a main effect of target size ($F(1,9)=29.199$, $p<0.001$, $\eta 2=0.764$) was found. The mean error index for the 20 mm target was 21.03% higher in comparison to the 60 mm target (FIG. 13)

Effects of Head Supported Mass on Performance

Figure 14:
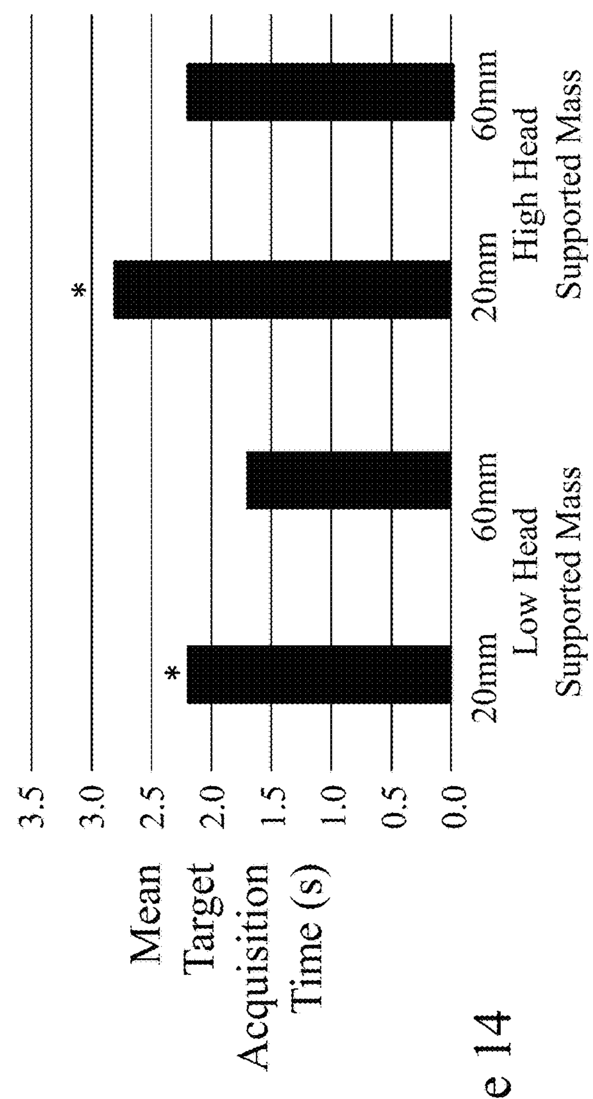
FIG. 14 depicts results for mean target acquisition time for small and large target dimensions for user with low and high head supported masses.

Referring to FIG. 14 there are depicted results for mean TAT for small and large target dimensions for user with low and high head supported masses. The mean TAT increasing from approximately 2.2 second for 20 mm diameter targets with low head supported mass to approximately 2.8 seconds for the same diameter targets but with high head supported mass. In contrast, the mean TAT increases from approximately 1.7 seconds to approximately 2.2 seconds for 60 mm targets as the user's head supported mass increases from low to high. Now referring to FIG. 15 there are depicted the results for the time to move off target for users with low and high head supported masses. This being approximately 0.45 seconds for low head supported masses and approximately 0.49 seconds for high head supported masses.

Test-Retest Reliability of the 3D-VTAS

The primary objective of the experiments was to determine the test-retest reliability of the 3D-VTAS in quantifying target acquisition time between experimental session days and to understand the effects of movement trajectory and target size on performance. However, the inventors only manipulated the index of difficulty by altering only target diameter. By modifying only target width across movement trajectories: performance details associated with target diameter were isolated, as the movement amplitude was rigidly defined for this study at 70°. Accordingly, the calculated intraclass coefficients for both TAT and EI appear to vary as a function of target size. For example, the ICCs (FIG. 8B) for TAT and EI for the 60 mm-MTa condition both demonstrated poor reliability (below 0.4), while the ICCs for the 20 mm-MTa condition were fair and excellent, respectively. Though the TAT and EI ICC values for the 20 mm sized targets across movement trajectories varied between either fair or excellent, the ICC values for both of these dependent variables for the 60 mm sized targets across movement trajectories ranged from poor to fair. The inventors believe that the poor reliability values reported for the 60 mm target are a function of the solar panel design, first image 300A in FIG. 3, wherein a 4 mm wide inactive area (blind spot) that is not responsive to the laser used in this study exists. This finding is corroborated by the subjective ratings provided by participants fact, one participant stated in his comments that the dead spot on the solar panel was the "biggest obstacle in the experiment."

For the mean TMOT, all calculated ICCs for each condition, with the exception of the 20 mm target for MTa, had reliability scores that ranged from fair (0.436) to excellent (0.847) The overall subjective rating score provided by participants indicated that the 20 mm target had little effect on participant performance. This is likely attributable to the fact that the 20 mm target mask was from the center of the solar panel and the 4 mm inactive region. This finding demonstrates the general utility and robustness of the 3D-VTAS in assessing participant's ability to perceive changes in color, react, and initiate movement. Moreover, the subjective ratings provided by participants on the ability of the 3D-VTAS to assess their visual perceptive capabilities and neck function, further highlights the utility and feasibility of the system.

Effects on Visual Target Acquisition Performance

As with any motor task, some improvement may be expected due to learning. Fortunately, "Fitts's serial or discrete paradigm is extremely simple, and good performance levels are readily achieved." Despite the claim that Fitts' Law is resistant to learning effects small improvements in movement time attributable to practice have been previously reported. Nevertheless, learning effects are a nagging, ubiquitous source of variation in experiments that seek to evaluate "expert" behavior.

The effect of practice on visual target acquisition performance was evident in 3 out of the 4 dependent variables analyzed in this study. Interestingly, an almost exact degree of improvement in mean target acquisition time (4.57%) and the calculated mean error index (4.58%) is noted. As the mean TAT metric includes homing time for participants to stabilize their gaze on target, it is not surprising that the improvements in target acquisition performance and the mean error index are closely related.

To mitigate these learning effects, most researchers provide a sufficient amount of practice in a session prior to data collection to familiarize participants with the experimental protocol and minimize the contribution of learning on performance. Oftentimes, research pragmatics prevent subjects from practicing up to expert status. However, attaining expert status can require a tremendous amount of practice. For example, to control for the effects of learning on a discrete ultrasonic head-controlled Fitts'-based pointing task a prior art experiment had participants perform 15 sets of 48 trials in a practice session prior to conducting the experimental data collection sessions, during different days. Although, the first 15 sets or 720 trials were considered practice trials, participant performance still continued to faintly improve up to 30 sets or 1640 trials.

Therefore, it would appear from a logistical perspective that providing sufficient practice to reach expert status is beyond the reach of most investigators. However, it is important to recognize and account for learning effects when attempting to evaluate the changes over time in an individual the effect of clinical rehabilitation on performance). Thus, the magnitude of the change has to exceed the inherent variability of the outcome, including learning effects.

The larger MTa interaction effect of day and movement trajectory on TMOT potentially suggest that the participants are better able to adapt to this novel task in the movement plane that has the greatest eye-head coordination. The time to move off target (TMOT) metric calculated in this study is thought to be somewhat analogous to reaction time with a couple of caveats. Reaction time as defined within the prior art is typically "the time between the onset of the stimulus light and the breaking of contact between the stylus and the starting button (RT) was recorded".

However, the TMOT metric is believed to be comprised of 3 different elements: 1) visual perception of change in LED color from blue to green; 2) reaction time; and 3) movement initiation to reorient the laser off of the target. Though movement kinematics were not reported in this study, it is important to realize that important information related to the repeatability of movement control in various movement planes was found. Analyses of head kinematics, along with TMOT metrics, should offer the investigator a more comprehensive perspective on how time optimal head movements are organized. Accordingly, in studying movement kinematics, the experiments go beyond the question of how long it takes to reach a target of a given size located at a given distance, to address the issue of how the movement itself is organized or impacted for the user. Accordingly, such analyses are important in the domain of perceptuomotor control as it is widely accepted that movement kinematics offer a more fine-grained window into these processes.

Effect of Movement Trajectory on Visual Target Acquisition Performance

An outcome of the experimental results performed is the main effect of movement trajectory on visual target acquisition performance. Reciprocally elicited axial head rotations (MTa) across both target sizes when compared to all other movement trajectories produced the fastest mean TATs. These findings are somewhat similar to those reported within the prior art in two dimensions, where both the helmet-mounted sight and the joy-stick control systems had slightly faster movement times along the horizontal than along the diagonal axis.

Despite the fact that the moment generating capacity of the cervical spine in axial rotation is less than that of extension and lateral flexion, the neuromusculoskeletal system appears to be designed to generate the fastest time-optimal head movements in the transverse plane. This finding has several implications across a diverse number of fields, including ergonomics, rehabilitation, human computer interaction, driving, etc. For example, scanning behaviours utilized by pilots and drivers alike appear to be optimized in the plane of axial rotation and could be used to inform the design of the field of regard in cockpits or head mounted displays for example.

Effect of Target Size on Visual Target Acquisition Performance

As anticipated, target diameter had a large effect on target acquisition time and appears to be intimately related to the frequency of errors during the visual acquisition of targets. A predictive model of error rate based on Fitts' Law parameters derived and empirically validated showed that target size has a disproportionately greater effect on error rate when compared to movement amplitude. Error frequencies in early research were found to be essentially independent of movement amplitudes, but were more frequent for the two smaller than for the two larger targets.

The inventors with their 3D-VTAS experiments did not manipulate movement amplitude and hence the calculated error index or rate was not affected by movement trajectory despite the notion that error rates increase with faster movement times. Despite the claim that Fitts' Law is purported to not readily support the prediction of errors the inventors were able to utilize the relative timing information of the blue and green LED signals to estimate participant's error rate across conditions.

Whilst some limitations of the initial experimental study make it difficult to generalize the results to the broader population, and include, small sample size, exclusively using male participants, and the narrow age range of participants. As well, for each participant the day two session was completed on a different day of the week and time as compared to the day one session. Prior to conducting the experiment, the inactive region of the solar panel was anticipated to cause some difficulties for participants in acquiring the 60 mm target. However, the experimental results validated the design concept of the 3D-VTAS and its effectiveness at deriving the required information in configurations that support portable and mobile system configurations together with ease of reconfiguration.

Accordingly, it would be evident that improving the design and performance of the optical photodetector targets would remove any dead zone (inactive region) whilst providing improved analytics such as with a 2D CMOS sensor, for example, wherein user stability in the period of "lighting" the target could be assessed or their trajectories etc. Further, rather than fixed or replaceable apertures an electrically controllable aperture, e.g. electromechanical iris, may be employed to allow system setting of aperture such that aperture and hence target difficulty could be dynamically adjusted during a user's session.

It would be evident that the inventors through their 3D-VTAS system have proven Fitts' Law as a robust tool that could be used to assess both performance and potentially the proprioceptive and neuromuscular status of the cervical spine. As Fitts' Law was the basis for the design of the 3D-VTAS, the inventors anticipated that the system as designed would be reasonably repeatable for assessing performance of the cervical spine. By taking an average of trial TAT, TMOT, and EI means across each respective condition, the inventors expect that the effect of participant variability on overall performance can be minimized. In prior art assessments of the test-retest reliability of the cervicocephalic relocation test to neutral head position one goal of researchers was to determine the number of trial recordings required to ensure reliable measurements. Accordingly, it was found that ICCs for the horizontal, vertical, and global components increased in direct proportion to the number of trials analyzed, with excellent, moderate, and excellent results for each component reported on the tenth trial, respectively. Accordingly, a simple, fast, portable 3D-VTAS allows for the measurements to be performed on a specific user or sample population in a manner minimizing disruptions etc. Further, the 3D-VTAS allows the measurements to be performed in a variety of environments allowing for determination of other external effects impacting the user's performance such as overall local environment, ambient light, atmospheric conditions, etc.

By effectively modulating only target size to increase the index of difficulty, the inventors were able to gain further insight into how the neuromusculoskeletal system uses visual information and visual feedback to generate a motor response across different movement planes of the cervical spine. Aside from the inventor's primary objective of evaluating the 3D-VTAS to demonstrate improved reliability, one of the underlying goals of this experimental study was to demonstrate the potential feasibility of the inventive 3D-VTAS system in assessing the effect of neck pain and/or head supported mass on performance. Accordingly, Mean TMOT and EI appear to be robust measures that could be used to assess the effect of neck pain, injury (whiplash, concussion), and neurological disorders, therapy and/or medical treatments, and ergonomic risk factors and interventions on performance.

Accordingly, the inventors anticipate that the application of a Fitts' task to a population with neck pain, for example, through use of a 3D-VTAS within a physician's surgery, hospital, clinic, research institute etc. can provide meaningful functional measurements, as motor control and proprioceptive deficits may serve as better tools to define impairment, rather than attempting to measure pain itself in isolation. Further, by dissecting the kinematic and kinetic details from this goal oriented movement task it may be possible to illuminate the aspects of movement and motor control that relate to the functional disability of the individual or impacts of an ergonomic aspect of an item, e.g. helmet, head-mounted display (HMD), etc. which are non-traumatic in origin. Beyond being able to assess time optimal head movements, the 3D-VTAS may seamlessly be integrated with eye-tracking data, via a motion capture system or eye-tracker integrated into a headset, HMD etc. in order to better understand eye-head coordination following a perturbation, such as that induced by travel to space and habituation to microgravity, for example.

Within the preceding description and discussion of the 3D-VTAS such as depicted in functional block schematic form in FIG. 2 the 3D-VTAS has been described and depicted with respect to a stand-alone discrete system. However, it would be evident that the 3D-VTAS concept may form part of a larger medical, commercial, regulatory network or framework of such systems.

Referring to FIG. 14 there is depicted a network environment 1400 within which embodiments of the invention may be employed supporting visual target acquisition systems, applications, and platforms (VTASAPs) according to embodiments of the invention. As shown first and second user groups 1400A and 1400B respectively interface to a telecommunications network 1400. Within the representative telecommunication architecture, a remote central exchange 1480 communicates with the remainder of a telecommunication service providers network via the network 1400 which may include for example long-haul OC-48/OC-192 backbone elements, an OC-48 wide area network (WAN), a Passive Optical Network, and a Wireless Link. The central exchange 1480 is connected via the network 1400 to local, regional, and international exchanges (not shown for clarity) and therein through network 1400 to first and second cellular APs 1495A and 1495B respectively which provide Wi-Fi cells for first and second user groups 1400A and 1400B respectively. Also connected to the network 1400 are first and second Wi-Fi nodes 1410A and 1410B, the latter of which being coupled to network 1400 via router 1405. Second Wi-Fi node 1410B is associated with Enterprise 1460, such as Adam & Eve™ for example, within which other first and second user groups 1400A and 1400B are disposed. Second user group 1400B may also be connected to the network 1400 via wired interfaces including, but not limited to, DSL, Dial-Up, DOCSIS, Ethernet, G.hn, ISDN, MoCA, PON, and Power line communication (PLC) which may or may not be routed through a router such as router 1405.

Within the cell associated with first AP 1410A the first group of users 1400A may employ a variety of PEDs including for example, laptop computer 1455, portable gaming console 1435, tablet computer 1440, smartphone 1450, cellular telephone 1445 as well as portable multimedia player 1430. Within the cell associated with second AP 1410B are the second group of users 1400B which may employ a variety of FEDs including for example gaming console 1425, personal computer 1415 and wireless/Internet enabled television 1420 as well as cable modem 1405. First and second cellular APs 1495A and 1495B respectively provide, for example, cellular GSM (Global System for Mobile Communications) telephony services as well as 3G and 4G evolved services with enhanced data transport support. Second cellular AP 1495B provides coverage in the exemplary embodiment to first and second user groups 1400A and 1400B. Alternatively the first and second user groups 1400A and 1400B may be geographically disparate and access the network 1400 through multiple APs, not shown for clarity, distributed geographically by the network operator or operators. First cellular AP 1495A as show provides coverage to first user group 1400A and environment 1470, which comprises second user group 1400B as well as first user group 1400A. Accordingly, the first and second user groups 1400A and 1400B may according to their particular communications interfaces communicate to the network 1400 through one or more wireless communications standards such as, for example, IEEE 802.11, IEEE 802.15, IEEE 802.16, IEEE 802.20, UMTS, GSM 850, GSM 900, GSM 1800, GSM 1900, GPRS, ITU-R 5.138, ITU-R 5.150, ITU-R 5.280, and IMT-1000. It would be evident to one skilled in the art that many portable and fixed electronic devices may support multiple wireless protocols simultaneously, such that for example a user may employ GSM services such as telephony and SMS and Wi-Fi/WiMAX data transmission, VOW and Internet access. Accordingly, portable electronic devices within first user group 1400A may form associations either through standards such as IEEE 802.15 and Bluetooth as well in an ad-hoc manner.

Also connected to the network 1400 are:

Social Networks (SOCNETS) 1465;

Original Equipment Manufacturer (OEM) 1470A, for example Lancer, Sony, GoPro etc.;

Manufacturer 1470B, for example General Dynamics, Microsoft etc.;

Retailer 1470C, for example Walgreens etc.;

Online retailer 1470D, for example Amazon etc.;

Website 1475A, for example US Government Department of Health;

Service provider 1475B, for example UnitedHealth Group;

Third party service provider 1475C, for example Anthem;

Enterprise 1475D, for example eSight; and

First and second servers 1490A and 1490B which together with others, not shown for clarity.

Accordingly, a user employing one or more VTASAPs may interact with one or more such providers, enterprises, service providers, retailers, third parties etc. and other users. First and second servers 1490A and 1490B may host according to embodiments of the inventions multiple services associated with a provider of visual target acquisition systems, applications, and platforms (VTASAPs); a provider of a SOCNET or Social Media (SOME) exploiting VTASAP features; a provider of a SOCNET and/or SOME not exploiting VTASAP features; a provider of services to PEDS and/or FEDS; a provider of one or more aspects of wired and/or wireless communications; an Enterprise 1460 exploiting VTASAP features; license databases; content databases; image databases; content libraries; customer databases; websites; and software applications for download to or access by FEDs and/or PEDs exploiting and/or hosting VTASAP features. First and second primary content servers 1490A and 1490B may also host for example other Internet services such as a search engine, financial services, third party applications and other Internet based services.

Accordingly, a user may exploit a PED and/or FED within an Enterprise 1460, for example, and access one of the first or second primary content servers 1490A and 1490B respectively to perform an operation such as accessing/downloading an application which provides VTASAP features according to embodiments of the invention; execute an application already installed providing VTASAP features; execute a web based application providing VTASAP features; or access content. Similarly, a user may undertake such actions or others exploiting embodiments of the invention exploiting a PED or FED within first and second user groups 1400A and 1400B respectively via one of first and second cellular APs 1495A and 1495B respectively and first Wi-Fi nodes 1410A.

Figure 15:
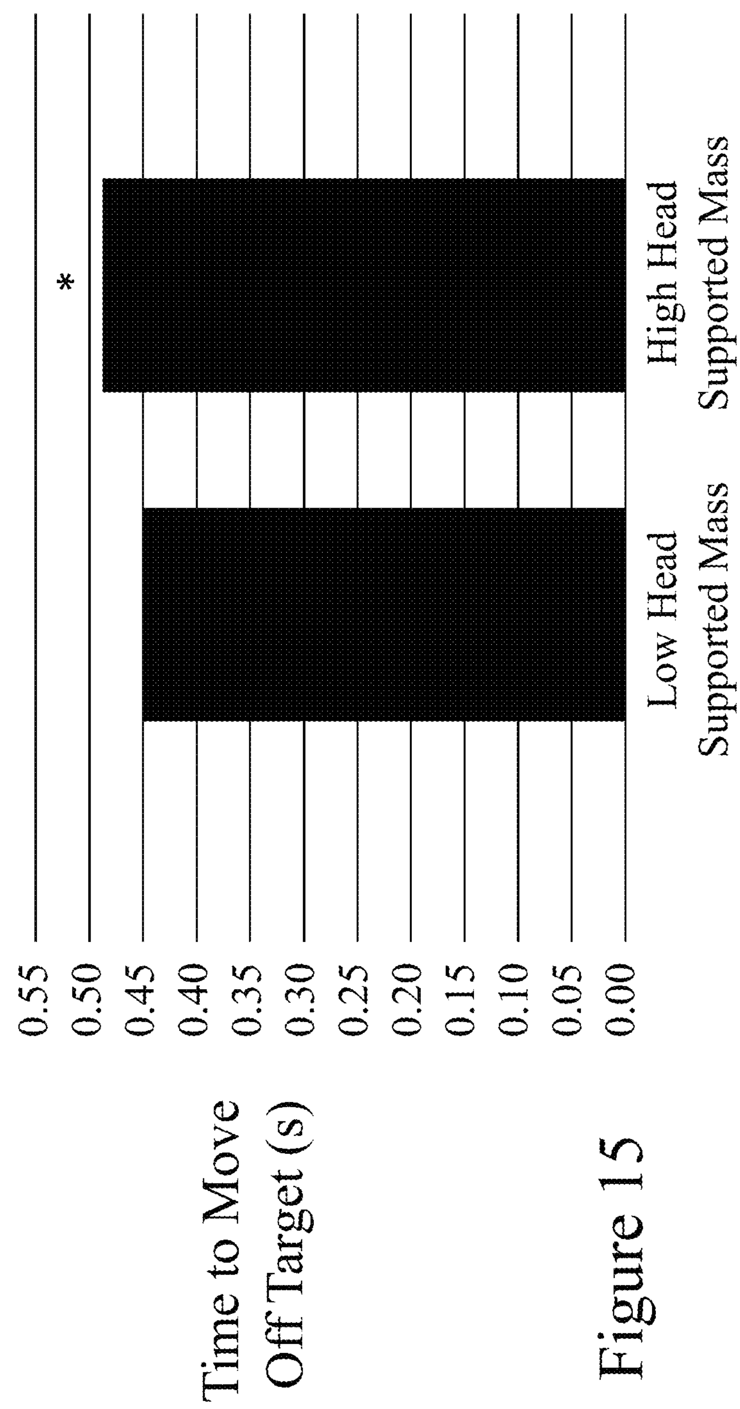
FIG. 15 depicts results for the time to move off target for users with low and high head supported masses.
Figure 16:
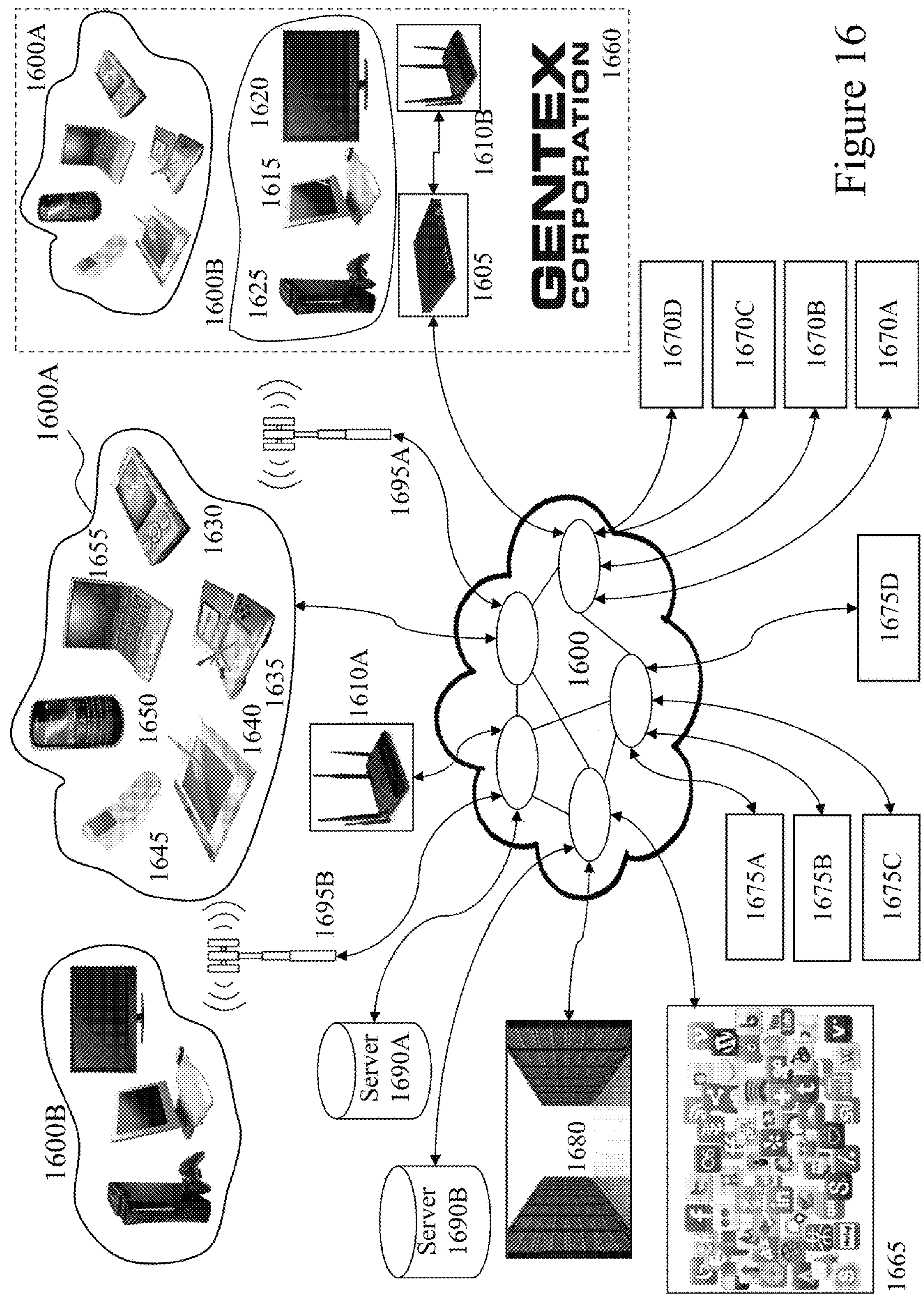
FIG. 16 depicts a network environment supporting visual target acquisition systems according to embodiments of the invention.
Figure 17:
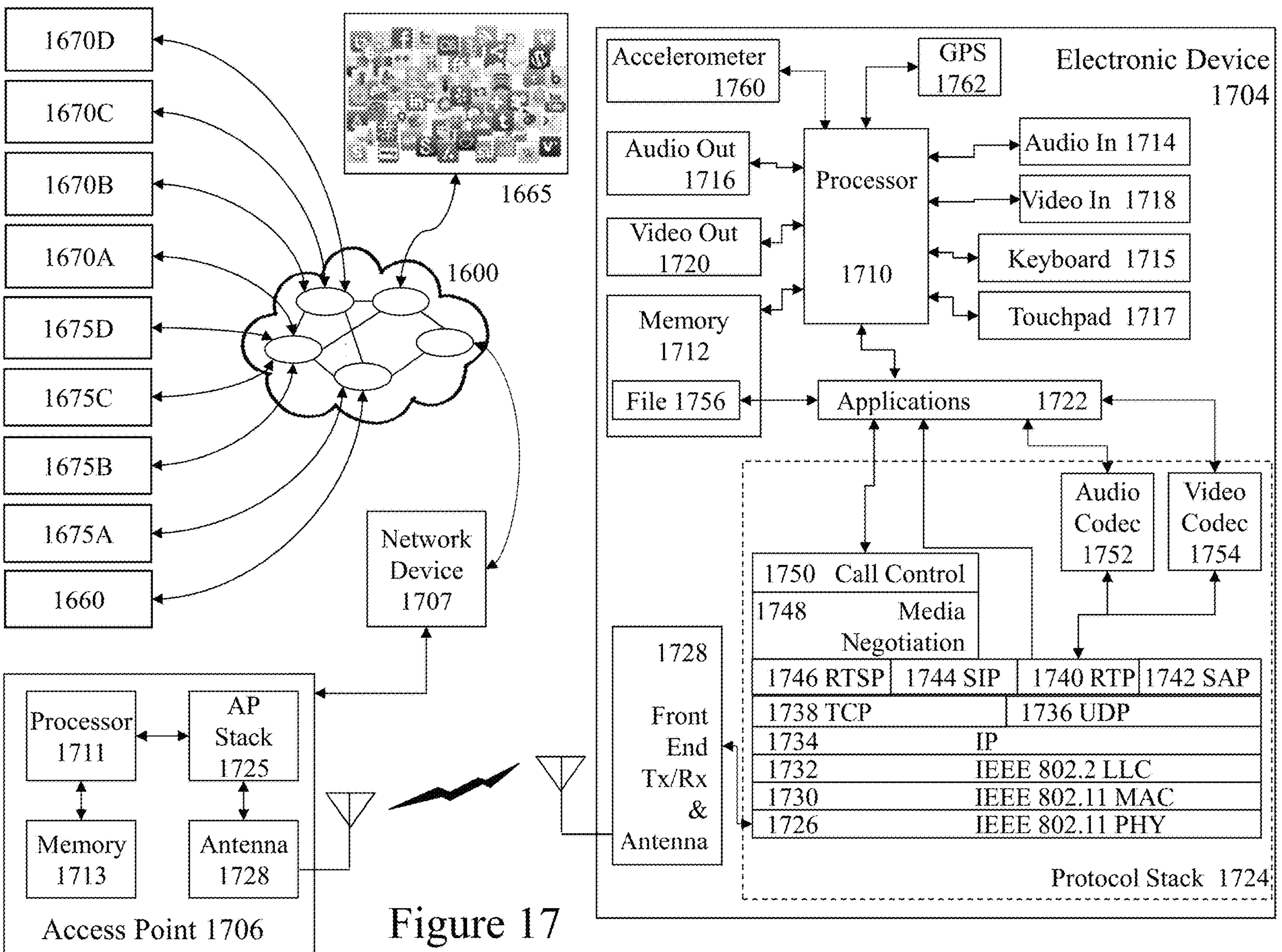
FIG. 17 depicts an electronic device supporting embodiments of the invention.

Now referring to FIG. 15 there is depicted an electronic device 1504 and network access point 1507 supporting VTASAP features according to embodiments of the invention. Electronic device 1504 may, for example, be a PED, a FED, a VTAS controller, and/or a VTAS Target and may include additional elements above and beyond those described and depicted. Also depicted within the electronic device 1504 is the protocol architecture as part of a simplified functional diagram of a system 1500 that includes an electronic device 1504, such as a smartphone 1455, an access point (AP) 1506, such as first AP 1410, and one or more network devices 1507, such as communication servers, streaming media servers, and routers for example such as first and second servers 1490A and 1490B respectively. Network devices 1507 may be coupled to AP 1506 via any combination of networks, wired, wireless and/or optical communication links such as discussed above in respect of FIG. 14 as well as directly as indicated.

Also connected to the network 1400 are:

- Social Networks (SOCNETS) 1465;
- Original Equipment Manufacturer (OEM) 1470A, for example Lancer, Sony, GoPro etc.;
- Manufacturer 1470B, for example General Dynamics, Microsoft etc.;
- Retailer 1470C, for example Walgreens etc.;
- Online retailer 1470D, for example Amazon etc.;
- Website 1475A, for example US Government Department of Health;
- Service provider 1475B, for example UnitedHealth Group;
- Third party service provider 1475C, for example Anthem;
- Enterprise 1475D, for example eSight; and
- First and second servers 1490A and 1490B which together with others, not shown for clarity.

The electronic device 1504 includes one or more processors 1510 and a memory 1512 coupled to processor(s) 1510. AP 1506 also includes one or more processors 1511 and a memory 1513 coupled to processor(s) 1510. A non-exhaustive list of examples for any of processors 1510 and 1511 includes a central processing unit (CPU), a digital signal processor (DSP), a reduced instruction set computer (RISC), a complex instruction set computer (CISC) and the like. Furthermore, any of processors 1510 and 1511 may be part of application specific integrated circuits (ASICs) or may be a part of application specific standard products (ASSPs). A non-exhaustive list of examples for memories 1512 and 1513 includes any combination of the following semiconductor devices such as registers, latches, ROM, EEPROM, flash memory devices, non-volatile random access memory devices (NVRAM), SDRAM, DRAM, double data rate (DDR) memory devices, SRAM, universal serial bus (USB) removable memory, and the like.

Electronic device 1504 may include an audio input element 1514, for example a microphone, and an audio output element 1516, for example, a speaker, coupled to any of processors 1510. Electronic device 1504 may include a video input element 1518, for example, a video camera or camera, and a video output element 1520, for example an LCD display, coupled to any of processors 1510. Electronic device 1504 also includes a keyboard 1515 and touchpad 1517 which may for example be a physical keyboard and touchpad allowing the user to enter content or select functions within one of more applications 1522. Alternatively, the keyboard 1515 and touchpad 1517 may be predetermined regions of a touch sensitive element forming part of the display within the electronic device 1504. The one or more applications 1522 that are typically stored in memory 1512 and are executable by any combination of processors 1510. Electronic device 1504 also includes accelerometer 1560 providing three-dimensional motion input to the process 1510 and GPS 1562 which provides geographical location information to processor 1510.

Electronic device 1504 includes a protocol stack 1524 and AP 1506 includes a communication stack 1525. Within system 1500 protocol stack 1524 is shown as IEEE 802.11 protocol stack but alternatively may exploit other protocol stacks such as an Internet Engineering Task Force (IETF) multimedia protocol stack for example. Likewise, AP stack 1525 exploits a protocol stack but is not expanded for clarity. Elements of protocol stack 1524 and AP stack 1525 may be implemented in any combination of software, firmware and/or hardware. Protocol stack 1524 includes an IEEE 802.11-compatible PHY module 1526 that is coupled to one or more Tx/Rx & Antenna Circuits 1528, an IEEE 802.11-compatible MAC module 1530 coupled to an IEEE 802.2-compatible LLC module 1532. Protocol stack 1524 includes a network layer IP module 1534, a transport layer User Datagram Protocol (UDP) module 1536 and a transport layer Transmission Control Protocol (TCP) module 1538. Protocol stack 1524 also includes a session layer Real Time Transport Protocol (RTP) module 1540, a Session Announcement Protocol (SAP) module 1542, a Session Initiation Protocol (SIP) module 1544 and a Real Time Streaming Protocol (RTSP) module 1546. Protocol stack 1524 includes a presentation layer media negotiation module 1548, a call control module 1550, one or more audio codecs 1552 and one or more video codecs 1554. Applications 1522 may be able to create maintain and/or terminate communication sessions with any of devices 1507 by way of AP 1506.

Typically, applications 1522 may activate any of the SAP, SIP, RTSP, media negotiation and call control modules for that purpose. Typically, information may propagate from the SAP, SIP, RTSP, media negotiation and call control modules to PHY module 1526 through TCP module 1538, IP module 1534, LLC module 1532 and MAC module 1530. It would be apparent to one skilled in the art that elements of the electronic device 1504 may also be implemented within the AP 1506 including but not limited to one or more elements of the protocol stack 1524, including for example an IEEE 802.11-compatible PHY module, an IEEE 802.11-compatible MAC module, and an IEEE 802.2-compatible LLC module 1532. The AP 1506 may additionally include a network layer IP module, a transport layer User Datagram Protocol (UDP) module and a transport layer Transmission Control Protocol (TCP) module as well as a session layer Real Time Transport Protocol (RTP) module, a Session Announcement Protocol (SAP) module, a Session Initiation Protocol (SIP) module and a Real Time Streaming Protocol (RTSP) module, media negotiation module, and a call control module. Portable and fixed electronic devices represented by electronic device 1504 may include one or more additional wireless or wired interfaces in addition to the depicted IEEE 802.11 interface which may be selected from the group comprising IEEE 802.15, IEEE 802.16, IEEE 802.20, UMTS, GSM 850, GSM 900, GSM 1800, GSM 1900, GPRS, ITU-R 5.138, ITU-R 5.150, ITU-R 5.280, IMT-1000, DSL, Dial-Up, DOCSIS, Ethernet, G.hn, ISDN, MoCA, PON, and Power line communication (PLC).

Also depicted is ASsociated DEVice (ASDEV) 1570 which is coupled to the electronic device 1504 through a wireless interface between Antenna 2715 and Tx/Rx & Antenna Circuits 1528 wherein the electronic device 1504 may support, for example, a national wireless standard such as GSM together with one or more local and/or personal area wireless protocols such as IEEE 802.11 a/b/g Wi-Fi, IEEE 802.16 WiMAX, and IEEE 802.15 Bluetooth for example. The Antenna 1572 is connected to Processor 1574 and therein to Memory 1576, Drivers 1578, and Features 1580. Accordingly, the ASDEV 1570 may operate as standalone device with factory installed control routines accessed through an interface on the ASDEV 1570, not shown for clarity, or through an application in execution upon the electronic device 1504. Subsequently, as described below one or more of these control routines may be modified, amended, deleted etc. whilst other new control routines may be created, acquired, installed etc.

Accordingly, it would be evident to one skilled the art that the ASDEV 1570 with associated electronic device 1504 may accordingly download original software and/or revisions for a variety of functions supported by the drivers 1578 and/or features 1580. In some embodiments of the invention the functions may not be implemented within the original as sold ASDEV 1570 and are only activated through a software/firmware revision and/or upgrade either discretely or in combination with a subscription or subscription upgrade for example.

Accordingly, an Electronic Device 1504 may be a Target 260 wirelessly coupled to an Access Point 1506 or alternatively it may be a VTAS controller coupled to the Access Point 1506. Accordingly, a VTAS may be configured such that links between the elements may exploit electrical communications, optical communications, wireless communications, serial communications, parallel communications, or a combination thereof provided that the communications achieve the required bandwidth, speed, timing accuracy, synchronization etc. required for the 3D-VTAS to operate. Communications between functional blocks may be synchronous, asynchronous or plesiochronous.

Within embodiments of the invention the 3D-VTAS may be operated under different illumination conditions, different ambient noise environments, with additional mechanical stimulation (e.g. vibration in one or more axes, rotation in one or more axes, etc.), with additional visual stimuli, etc. Optionally, the 3D-VTAS may be part of a simulation system, such as a motion simulator, a flight simulator, etc. Optionally, the 3D-VTAS may form part of an overall motion capture system allowing motion capture of the user to be combined with timing data with respect to the user's acquisition of targets. Such motion capture may, for example, employ illumination within the infra-red region of the electromagnetic spectrum whilst the user is visualizing in the visible region of the electromagnetic spectrum or vice-versa for example. Optionally, the user may be employing night vision equipment, infra-red vision equipment, thermal imaging equipment etc. rather than wearing a helmet with dummy devices to simulate the weight.

Whilst within embodiments of the invention the VTAS has been described with respect to a user wearing a head mounted laser pointer and selecting targets it would be evident that within other embodiments of the invention a user's performance may be similarly established using a VTAS according to an embodiment of the invention wherein the VTAS may be virtually implemented such that an augmented reality (AR) or virtual reality (VR) world is presented to the user requiring them to move and select the targets allowing assessment of AR/VR headsets, HMDs etc. directly without modification. In this manner within a VR system the VTAS targets are virtually presented and the user's head motion is tracked through inertial devices within the VR headset such that their displayed view adapts and reacts just as they would see in the real world. In this manner a population base may be monitored over an extended period of time across a large population base etc. Such a virtual VTAS could, for example, be built within a game as a training stage or a level to complete such that every user of the VR headset provides data which is linked through a user profile of the user to them. Accordingly, impact of use could be established within an extended gaming session, over a period of time etc. Optionally, a VTAS could be implemented with camera based image processing to determine when the user has moved their head such that for example a VTAS may exploit a user's PED or FED such as their smartphone, gaming console, laptop, etc. to perform the data acquisition wherein a user is established at a position relative to the PED or FED and presented with image data to perform a task relating to it such as touch the screen at certain point requiring them to move their head, remove a displayed object from their field of vision etc. Such VTAS systems may also be employed to provide data on a user's other motor functions such as for example arm movement, hand-eye coordination etc. by requiring the user to visualize a target and select it.

Within embodiments of the invention the VTAS, e.g. a 3D-VTAS, may incorporate measurements obtained with other devices including wearable devices, wearable sensors, etc. to provide, for example, respiratory and heart rate information to assess user's stress—anxiety etc. during a session. Optionally, wearable devices or wearable sensors may be discrete devices or form part of a PED and/or FED such as stand mounted medical equipment, floor or wall mounted medical equipment etc. Optionally, EEG, ECG etc. may be measured whilst other wearable devices and/or sensors or non-wearable devices and/or sensors may establish information such as that derived from environmental sensors, medical sensors, biological sensors, physiological sensors, chemical sensors, ambient environment sensors, position sensors, neurological sensors, drug delivery systems, medical testing and diagnosis devices, and motion sensors.

Accordingly, within embodiments of the invention what the inventors refer to as the quantified self may be further incorporated into the data associated with a user and their session(s) exploiting a VTAS according to an embodiment of the invention. As such additional data relation to the user may be employed within the analysis including data relating to a user's daily life (e.g. food consumed, quality of surrounding air), states (e.g. mood, arousal, blood oxygen levels), and performance (mental and physical). Acquisition of data may be combine wearable sensors (EEG, ECG, video, etc.) and wearable computing together with audio, visual, audiovisual and text based content generated by the user as well as data relating to audio, visual, audiovisual and text based content provided to the user during the session such that user's performance in the presence of disruptions, background noise, high ambient light, low ambient light, etc. may be obtained as well as having the user perform a task such as recite audio content fed to them whilst acquiring targets etc.

Accordingly, a user's biometric information may also be incorporated such as data relating to a subset of conditions including, but not limited to, their environment, medical condition, biological condition, physiological condition, chemical condition, ambient environment condition, position condition, neurological condition, drug condition, and one or more specific aspects of one or more of these said conditions. Accordingly, such biometric information may include, but not be limited, blood oxygenation, blood pressure, blood flow rate, heart rate, temperate, fluidic pH, viscosity, particulate content, solids content, altitude, vibration, motion, perspiration, EEG, ECG, energy level, etc. In addition, biometric information may include data relating to physiological characteristics related to the shape and/or condition of the body wherein examples may include, but are not limited to, fingerprint, facial geometry, baldness, DNA, hand geometry, odour, and scent. Biometric information may also include data relating to behavioral characteristics, including but not limited to, typing rhythm, gait, and voice. Accordingly, within a VR VTAS environment the user may be asked to perform the session sitting, laying down, standing, walking, jogging, running etc. Performance may be real in that the user moves around or may be simulated through a treadmill for example. Equally, a physical VTAS such as described in respect of FIGS. 3A to 5 may employ a treadmill wherein walking represents a small increase in difficulty but running provides a large increase in difficulty with smaller targets as the user must now compensate for an overall motion of their body as well as perform the required lateral and/or vertical movements to acquire and hold onto a target.

Within the embodiments of the invention a range of electronic content may be acquired, generated and/or employed. Whilst this may be any type of content that exists in the form of digital data as stored, transmitted, received and/or converted wherein one or more of these steps may be analog although generally these steps will be digital. Forms of digital content include, but are not limited to, information that is digitally broadcast, streamed or contained in discrete files.

Within embodiments of the invention a user may be associated with a profile which may, for example, comprise an anonymized identity rather than real world identity data together with data in the form of a computer and/or microprocessor readable data file comprising data relating to, for example, session data, settings and/or limits of an visual target acquisition session, acquired digital and/or analog data acquired during a session, data obtained from associated wearable devices and/or wearable sensors etc. Such profiles may be established by a manufacturer/supplier/provider of a device, service, etc. or they may be established by a user through a user interface for a device, a service or a PED/FED in communication with a device, another device, a server or a service provider etc.

Within the embodiments of the invention presented supra the user wears a GoPro assembly with an interface adapter to a laser pointer. However, it would be evident that the laser pointer may alternatively be mounted to a helmet, VR headset, HMD, or other element worn or attached to the user such as attached to their head, arm, hand, leg, foot, etc. However, it would also be evident that the laser pointer may be replaced with any optical emitter capable of providing an optical illumination that is collimated or has a very low angular divergence, a beam diameter compatible with the required level of accuracy required to select the target, and optical emission within a wavelength range to which the optical photodetector within target. Accordingly, user may wear a military helmet with a laser pointer attached to a mounting point or fitted within a night vision goggle to provide comparable form—fit—weight and weight distribution of the real world device for which the user's performance data is required. Alternatively, an optical emitter within an HMD for mapping the user's environment or providing distance—depth information may be replaced with an optical source for illuminating the targets. Whilst not as simple as a visible optical system alternate systems may exploit an infra-red optical based system, ultra-violet optical based system, a microwave based system, or an RF based system. Alternatively, a projectile based system may be employed wherein timing information is derived from projectile hits on the target.

Within other embodiments the optical emitter or equivalent for "painting" the target may be within another device held, worn, or otherwise associated with the user. Such devices may include, but not be limited to, a pointer on a weapon, a pointer in association with a "scope" on a rifle, a pointer on a range finder, a pointer on a surveying instrument such as a theodolite, a Total Station, etc.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above and/or a combination thereof.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be rearranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages and/or any combination thereof. When implemented in software, firmware, middleware, scripting language and/or microcode, the program code or code segments to perform the necessary tasks may be stored in a machine readable medium, such as a storage medium. A code segment or machine-executable instruction may represent a procedure, a function, a subprogram, a program, a routine, a subroutine, a module, a software package, a script, a class, or any combination of instructions, data structures and/or program statements. A code segment may be coupled to another code segment or a hardware circuit by passing and/or receiving information, data, arguments, parameters and/or memory content. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor and may vary in implementation where the memory is employed in storing software codes for subsequent execution to that when the memory is employed in executing the software codes. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels and/or various other mediums capable of storing, containing or carrying instruction(s) and/or data.

The methodologies described herein are, in one or more embodiments, performable by a machine which includes one or more processors that accept code segments containing instructions. For any of the methods described herein, when the instructions are executed by the machine, the machine performs the method. Any machine capable of executing a set of instructions (sequential or otherwise) that specify actions to be taken by that machine are included. Thus, a typical machine may be exemplified by a typical processing system that includes one or more processors. Each processor may include one or more of a CPU, a graphics-processing unit, and a programmable DSP unit. The processing system further may include a memory subsystem including main RAM and/or a static RAM, and/or ROM. A bus subsystem may be included for communicating between the components. If the processing system requires a display, such a display may be included, e.g., a liquid crystal display (LCD). If manual data entry is required, the processing system also includes an input device such as one or more of an alphanumeric input unit such as a keyboard, a pointing control device such as a mouse, and so forth.

The memory includes machine-readable code segments (e.g. software or software code) including instructions for performing, when executed by the processing system, one of more of the methods described herein. The software may reside entirely in the memory, or may also reside, completely or at least partially, within the RAM and/or within the processor during execution thereof by the computer system. Thus, the memory and the processor also constitute a system comprising machine-readable code.

In alternative embodiments, the machine operates as a standalone device or may be connected, e.g., networked to other machines, in a networked deployment, the machine may operate in the capacity of a server or a client machine in server-client network environment, or as a peer machine in a peer-to-peer or distributed network environment. The machine may be, for example, a computer, a server, a cluster of servers, a cluster of computers, a web appliance, a distributed computing environment, a cloud computing environment, or any machine capable of executing a set of instructions (sequential or otherwise) that specify actions to be taken by that machine. The term "machine" may also be taken to include any collection of machines that individually or jointly execute a set (or multiple sets) of instructions to perform any one or more of the methodologies discussed herein.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method comprising:

providing to a user a plurality of targets, each target comprising a target zone and an indicator capable of presenting a plurality of indications to the user;

determining timing data relating to acquisition of a subset of the plurality of targets;

establishing data relating to the user in dependence upon the timing data; wherein the subset of the plurality of targets established in a particular sequence, the sequence comprising:

a first pair of targets within the transverse plane (yaw) relative to the user;

a second pair of targets within the sagittal plane (pitch) relative to the user;

a third pair of targets diagonally upper left to center relative to the user; and a fourth pair of targets diagonally upper right to center relative to the user.

2. The method according to claim 1, wherein the data relating to the user established in dependence upon the timing data comprises at least one of:

a mean dwell time (DT) calculated as the duration of a first indication of the plurality of indications to the user prior to a successful target acquisition;

a mean target acquisition time (TAT), calculated as difference in time between the rising edge of a second indication of the plurality of indications of a start target of the plurality of targets indicating acquisition of the start target of the plurality of targets and the rising edge of the second indication of the plurality of indications of a goal target of the plurality of targets;

a mean time to move off target (TMOT), calculated as the duration of the second indication of the plurality of second indications indicating duration the user acquires the target of the plurality of targets; and a mean error index (EI), calculated as the ratio of the number of rising edges of first indications of the plurality of indications to the number of rising edges of the second indication of the plurality of indications.

3. The method according to claim 1, wherein each indication of the plurality of indications is a different colour LED signal.

4. The method according to claim 1, wherein each target comprises an optical photodetector; and the timing data relating to acquisition of a target of the plurality of targets comprises illumination of the optical photodetector by an optical source worn by the user.

5. The method according to claim 1, wherein the user wears a virtual reality headset; and the plurality of targets are virtually presented to the user within a virtual reality environment.

6. A system comprising:

a device comprising a microprocessor coupled to a memory which stores computer executable instructions which when executed by the microprocessor configure the device to:

generate user specific data relating to movement of a predetermined element of a user's anatomy in dependence upon established timing information with respect to the movement of the predetermined element of the user's anatomy as the user establishes acquisition of a plurality of targets; wherein at least one of:

the user specific data relates to a determination of an impact on the user of the wearing an item of equipment upon the predetermined element of the user's anatomy; and the impact relating to the user's movement of the predetermined element of the user's anatomy is established at multiple predetermined points in time after they initially don the item of equipment;

and the device is configured to provide indications to the user of a sequential subsets of the plurality of targets such that the user acquires a first target within each sequential subset of the plurality of targets and then acquires a second target within each sequential subset of the plurality of targets; and the sequential subsets of the plurality of targets are established in a sequence comprising:

a first sequential subset of the plurality of targets are disposed within the transverse plane (yaw) relative to the user;

a second sequential subset of the plurality of targets are disposed within the sagittal plane (pitch) relative to the user;

a third sequential subset of the plurality of targets are disposed diagonally upper left to center relative to the user; and a fourth sequential subset of the plurality of targets are disposed diagonally upper right to center relative to the user.

7. The system according to claim 6, further comprising:

the plurality of targets, each target comprising a target zone and an indicator capable of presenting a plurality of indications to the user; wherein the device is configured to:

determine timing data relating to acquisition of a subset of the plurality of targets; and establishing data relating to the user in dependence upon the timing data.

8. The system according to claim 6, wherein the data relating to the user established in dependence upon the timing data comprises at least one of:

a mean dwell time (DT) calculated as the duration of a first indication of the plurality of indications to the user prior to a successful target acquisition;

a mean target acquisition time (TAT), calculated as difference in time between the rising edge of a second indication of the plurality of indications of a start target of the plurality of targets indicating acquisition of the start target of the plurality of targets and the rising edge of the second indication of the plurality of indications of a goal target of the plurality of targets;

a mean time to move off target (TMOT), calculated as the duration of the second indication of the plurality of second indications indicating duration the user acquires the target of the plurality of targets; and a mean error index (EI), calculated as the ratio of the number of rising edges of first indications of the plurality of indications to the number of rising edges of the second indication of the plurality of indications.

9. The system according to claim 8, wherein each indication of the plurality of indications is a different colour LED signal.

10. The system according to claim 6, wherein the user wears a virtual reality headset; and the plurality of targets are virtually presented to the user within a virtual reality environment upon the virtual reality headset.

11. A system comprising:

a device comprising a microprocessor coupled to a memory which stores computer executable instructions which when executed by the microprocessor configure the device to:

generate user specific data relating to movement of a predetermined element of a user's anatomy in dependence upon established timing information with respect to the movement of the predetermined element of the user's anatomy as the user establishes acquisition of a plurality of targets; wherein either:

each target comprises an optical photodetector;

the user wears another device upon the predetermined element of the user's anatomy comprising an optical source aligned to an axis of the predetermined element of the user's anatomy; and the timing data relating to acquisition of a target of the plurality of targets comprises illumination of the optical photodetector by the optical source within the another device worn by the user;

or:

each target comprises a plurality of optical retroreflectors;

the user wears another device upon the predetermined element of the user's anatomy comprising an optical source aligned to an axis of the predetermined element of the user's anatomy and an optical photodetector in a predetermined position relative to the optical source; and the timing data relating to acquisition of a target of the plurality of targets comprises illumination of the optical photodetector by the optical source.

12. A system comprising:

a device comprising a microprocessor coupled to a memory which stores computer executable instructions which when executed by the microprocessor configure the device to:

generate user specific data relating to movement of a predetermined element of a user's anatomy in dependence upon established timing information with respect to the movement of the predetermined element of the user's anatomy as the user establishes acquisition of a plurality of targets; wherein the system further comprises either:

the plurality of targets, wherein each target comprises a photodetector; and an optical emitter worn by the user upon the predetermined element of the user's anatomy and aligned with the predetermined element of the user's anatomy; wherein the timing information is determined in dependence upon the user illuminating a first photodetector within a first target of the plurality of targets for a predetermined period after receiving an indication to illuminate the first target of the plurality of targets and illuminating a second photodetector within a second target of the plurality of targets after receiving an indication to illuminate the second target of the plurality of targets;

or:

the plurality of targets, wherein each target comprises one or more retroreflectors;

an optical emitter worn by the user upon the predetermined element of the user's anatomy and aligned with the predetermined element of the user's anatomy; and an optical detector worn by the upon the predetermined element of the user's anatomy in a predetermined position relative to the optical emitter; wherein the timing information is determined in dependence upon the user illuminating one or more retroreflectors within a first target of the plurality of targets for a predetermined period after receiving an indication to illuminate the first target of the plurality of targets and illuminating one or more retroreflectors within a second target of the plurality of targets after receiving an indication to illuminate the second target of the plurality of targets.

* * * * *